(12) United States Patent
Itoh

(10) Patent No.: US 6,341,867 B1
(45) Date of Patent: *Jan. 29, 2002

(54) POLARIZED LIGHT ILLUMINATION DEVICE AND PROJECTOR

(75) Inventor: Yoshitaka Itoh, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/373,207

(22) Filed: Aug. 12, 1999

Related U.S. Application Data

(63) Continuation-in-part of application No. 09/251,346, filed on Feb. 17, 1999.

(30) Foreign Application Priority Data

Feb. 18, 1998 (JP) .......................................... 10-036481

(51) Int. Cl.$^7$ .................. G03B 21/14; G03B 21/00; G03B 21/26; G03B 27/32; G03B 27/54
(52) U.S. Cl. ................. 353/20; 353/8; 353/9; 353/31; 353/94; 355/32; 355/67; 355/71
(58) Field of Search .............................. 355/71, 32, 67; 353/20, 8, 31, 94, 9

(56) References Cited

U.S. PATENT DOCUMENTS

| 5,295,018 A | 3/1994 | Konuma et al. |
| 6,042,234 A | * 3/2000 | Itoh ............................ 353/20 |

FOREIGN PATENT DOCUMENTS

| EP | 0 753-780 | 1/1997 |
| EP | 0 857-986 | 8/1998 |
| JP | A 7-244282 | 9/1995 |
| JP | A 8-029734 | 2/1996 |
| JP | A-8-211329 | 8/1996 |
| JP | A-8-220475 | 8/1996 |
| JP | 08-220475 | 8/1996 |
| JP | 11-030767 | 2/1999 |
| JP | 11-095171 | 4/1999 |

* cited by examiner

Primary Examiner—Russell Adams
Assistant Examiner—Khaled Brown
(74) Attorney, Agent, or Firm—Oliff & Berridge, PLC

(57) ABSTRACT

In a polarized light illumination apparatus, randomly polarized lights emitted from first and second light sources are respectively separated by a polarized light separating and combining element into two different types of polarized lights. Secondary light source images are formed at locations shifted from each other in an x direction, whereby polarization is aligned in the same single direction. At least two condensing mirror plates of first to third condensing mirror plates are shifted in parallel from the center axis of the polarized light separating and combining optical element so that secondary light source images formed by z-polarized lights (polarized in a z direction) emitted from the first and second light sources are superimposed upon each other, and secondary light source images formed by x-polarized lights (polarized in an x direction) emitted from the first and second light sources are superimposed upon each other. Thus, even though a plurality of light sources are used, the polarized light illumination apparatus can provide high-intensity illumination light using both polarization components without causing an increase in the illumination angle.

22 Claims, 15 Drawing Sheets

POLARIZED LIGHT
ILLUMINATION APPARATUS

[FIG. 14]
(A) EXAMPLE OF EMISSION SPECTRUM OF A FIRST LIGHT SOURCE
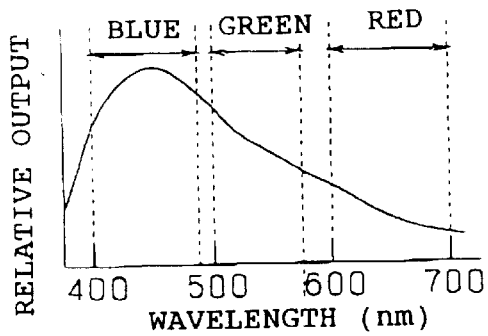
(B) EXAMPLE OF EMISSION SPECTRUM OF A SECOND LIGHT SOURCE
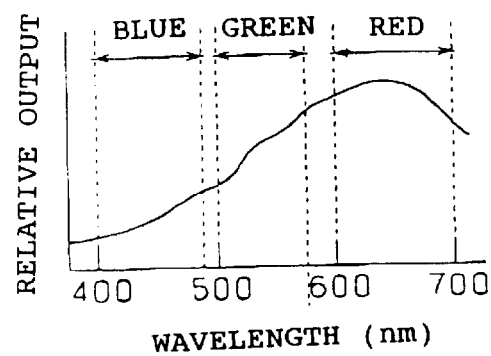
(C) EXAMPLE OF EMISSION SPECTRUM OF A POLARIZED LIGHT ILLUMINATION APPARATUS 1
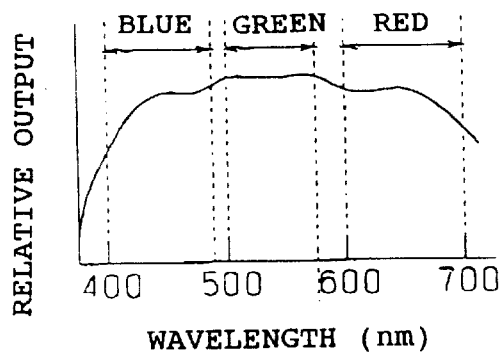

POLARIZED LIGHT ILLUMINATION DEVICE AND PROJECTOR

This is a Continuation-in-Part of application Ser. No. 09/251,346 filed Feb. 17, 1999. The entire disclosure of the prior application is hereby incorporated by reference herein in its entirety.

BACKGROUND OF THE INVENTION

1. Field of the Invention

The present invention relates to a polarized light illumination apparatus for uniformly illuminating a rectangular illumination area with light polarized in the same direction, and also to a projector using such a polarized light illumination apparatus. More particularly, the present invention relates to a structure for combining lights emitted from two light sources such that the resultant combined light is polarized in the same direction.

2. Description of Related Art

In liquid crystal display devices using a modulating element such as a liquid crystal element which modulates light polarized in a particular direction, only one component of two types of polarized light components included in light emitted from a light source is used. To obtain a projected image with high brightness, it is required to increase the utilization efficiency of light. However, when a projector is constructed using a single light source, the utilization efficiency of light has a practical upper limit. Thus, one technique of projecting a high-brightness image is to increase the amount of light by using a plurality of light sources.

However, if a plurality of light sources are arranged in a simple fashion, the overall area of the light source image becomes greater by a factor corresponding to the number of light sources. As a result, the angle of light (illumination angle) striking an illumination area also increases by a corresponding factor. This means that the amount of light per unit area is the same as that obtained with a single light source. In other words, the amount of light per unit area cannot be increased by using a plurality of light sources arranged in the above-described fashion.

Even when the amount of light can be increased by using a plurality of light sources, if only one component of two polarized light components of light emitted from the light sources is used, one-half of the total amount of light is wasted, which reduces its effectiveness by half.

SUMMARY OF THE INVENTION

It is an object of the present invention to provide a polarized light illumination apparatus including a plurality of light sources and capable of emitting light using both polarized light components without causing an increase in the illumination angle. It is another object of the present invention to provide a projector capable of forming a projected image with extremely high brightness.

To solve the issues described above, the present invention provides a polarized light illumination apparatus comprising:

first and second light sources;

a polarized light separating and combining optical element including: a first polarization separating film which transmits a linearly polarized light contained in light emitted from the first light source and polarized in a direction parallel to an incidence plane but which reflects a linearly polarized light contained in the light emitted from the first light source and polarized in a direction perpendicular to the incidence plane; and a second polarization light separating film which transmits a linearly polarized light contained in light emitted from the second light source and polarized in a direction parallel to the incidence plane but which reflects a linearly polarized light contained in light emitted from the second light source polarized in a direction perpendicular to the incidence plane;

a first condensing and reflecting optical element including a plurality of small condensing and reflecting elements for substantially reversing the traveling direction of the linearly polarized light transmitted through the first polarization separating film and forming a condensed light image;

a second condensing and reflecting optical element including a plurality of small condensing and reflecting elements for substantially reversing the traveling direction of the light reflected by the first polarization separating film and the second polarization separating film and forming a condensed light image;

a third condensing and reflecting optical element including a plurality of small condensing and reflecting elements for substantially reversing the traveling direction of the linearly polarized light transmitted through the second polarization separating film and forming a condensed light image;

a first polarization-state conversion optical element disposed between the polarized light separating and combining optical element and the first condensing and reflecting optical element;

a second polarization-state conversion optical element disposed between the polarized light separating and combining optical element and the second condensing and reflecting optical element;

a third polarization-state conversion optical element disposed between the polarized light separating and combining optical element and the third condensing and reflecting optical element; and a polarization conversion optical element for aligning the direction of polarization of the linearly polarized lights combined by the polarized light separating and combining optical element; the polarized light illumination apparatus being characterized in that a center axis of the light which is incident on the polarization conversion optical element after being reflected by the small condensing and reflecting elements of the first and third condensing and reflecting optical elements and a center axis of the light which is incident on the polarization conversion optical element after being reflected by the small condensing and reflecting elements of the second condensing and reflecting optical element are parallel to each other and do not overlap each other.

The construction of the polarized light illumination apparatus according to the present invention is described in further detail below.

Of the components of the light polarized in random directions (hereinafter, referred to as the randomly polarized light) emitted from the first light source, a linearly polarized light component polarized in a direction parallel to the incidence plane passes through the first polarization separating film, whereas a linearly polarized light component polarized in a direction perpendicular to the incidence plane is reflected by the first polarization separating film. On the other hand, of the components of the randomly polarized light emitted from the second light source, a linearly polarized light component polarized in a direction parallel to the incidence plane passes through the second polarization separating film, whereas a linearly polarized light component polarized in a direction perpendicular to the incidence plane is reflected by the second polarization separating film. Herein, the "incidence plane" is a technical term used in the art of optics to represent a virtual plane including the center axis of a light incident on a film, and also including the normal to the film.

The linearly polarized light which has passed through the first polarization separating film passes through the first polarization-state conversion optical element and is then reflected by the first condensing and reflecting optical element back to the first polarization-state conversion optical element. The light again passes through the first polarization-state conversion optical element and travels toward the polarized light separating and combining optical element. In the above process, the light is divided by the first condensing and reflecting optical element into a plurality of intermediate lights and converted to linearly polarized lights with a polarization rotated by about 90° when the light passes twice through the first polarization-state conversion optical element. Thus, when the light returns to the polarized light separating and combining optical element, the light is reflected by the first polarization separating film and directed toward the polarization conversion optical element. Herein, the polarized light directed toward the polarization conversion optical element is referred to as first polarized light.

The linearly polarized light reflected by the first polarization separating film and the second polarization film passes through the second polarization-state conversion optical element, and is then reflected by the second condensing and reflecting optical element. After that, the light again passes through the second polarization-state conversion optical element and travels toward the polarized light separating and combining optical element. In the above process, the light is divided by the second condensing and reflecting optical element into a plurality of intermediate lights and converted to linearly polarized lights with a polarization rotated by about 90° when the light passes twice through the second polarization-state conversion optical element. Thus, when the light returns to the polarized light separating and combining optical element, the light passes through the first and second polarization separating films and travels toward the polarization conversion optical element. This polarized light directed toward the polarization conversion optical element is a light polarized in a direction substantially perpendicular to the polarization direction of the first polarized light. This polarized light is herein referred to as second polarized light.

The linearly polarized light which has passed through the second polarization separating film further passes through the third polarization-state conversion optical element and is then reflected by the third condensing and reflecting optical element. The light again passes through the third polarization-state conversion optical element and travels toward the polarized light separating and combining optical element. In the above process, the light is divided by the third condensing and reflecting optical element into a plurality of intermediate lights and converted to linearly polarized lights with a polarization rotated by about 90° when the light passes twice through the third polarization-state conversion optical element. Thus, when the light returns to the polarized light separating and combining optical element, the light is reflected by the second polarization separating film and directed toward the polarization conversion optical element. This light is polarized in the same direction as the first polarized light. Thus, this light is also referred to as the first polarized light.

The center axes of the first and second polarized lights are parallel to each other, and they do not overlap each other. As a result, the condensed light image of the first polarized light and the condensed light image of the second polarized light are formed at locations different from each other. This makes it possible for the polarization conversion optical element to align the polarization direction of the first polarized light and the polarization direction of the second polarized light in the same direction.

Therefore, even though two light sources are used in the polarized light illumination apparatus according to the present invention, the lights emitted from the two light sources can strike the same area as that illuminated with light emitted from a single light source without causing an increase in the incident angle (illumination angle) of the illumination light to the illumination area. This means that the amount of light per unit area can be increased to a level approximately two times greater than that obtained with a single light source. This makes it possible to illuminate the illumination area very brightly. By superimposing intermediate lights separated by the respective condensing and reflective optical elements into a single light striking a single location in the illumination area, it becomes possible to uniformly illuminate the illumination area. Therefore, if the polarized light illumination apparatus according to the present invention is used as a light source of a display device, an image with excellent uniformity can be obtained. Furthermore, in the polarized light illumination apparatus according to the present invention, the randomly polarized lights emitted from the first and second light sources can be combined into a single type of polarized light without causing substantially any loss. Therefore, if the polarized light illumination apparatus is employed in a display device including a modulator such as a liquid crystal device for modulating a light polarized in a particular direction, a very bright image can be obtained.

Furthermore, as described above, the center axis of the light which is incident on the polarization conversion optical element after being reflected by the small condensing and reflecting elements of the first and third condensing and reflecting optical elements and the center axis of the light which is incident on the polarization conversion optical element after being reflected by the small condensing and reflecting elements of the second condensing and reflecting optical element are parallel to each other. This means that lights reflected by the small condensing and reflecting elements of the first to third condensing and reflecting optical elements are incident at substantially the same angle upon the polarized light separating and combining element. Therefore, even when the polarized light separating and combining characteristics of the polarized light separating and combining element is sensitive to the incident angle of light, polarized light separation and combination can be accomplished in a highly reliable fashion, and thus a uniform illumination light can be obtained.

Although the first to third condensing and reflecting optical elements are not limited to specific locations, it is required that they be disposed such that the first and third intermediate lights overlap each other on the polarization conversion optical element and such that the first and third intermediate lights do not overlap the second intermediate lights on the polarization conversion optical element.

In the present invention, the shape of the opening of each small condensing and reflecting element may be similar to the shape of an area to be illuminated. The lights emitted from the light sources are divided by the condensing and reflecting optical elements into a plurality of lights and, eventually, superimposed upon one another in the illumination area. Thus, it becomes possible to direct the lights emitted from the light sources to the illumination area without producing a loss.

In the present invention, a condensing optical element including a plurality of condensing elements for condensing the light emerging from the polarized light separating and combining element may be disposed on the incident side or the emitting side of the polarization conversion optical element so that a plurality of lights produced by means of dividing performed by the condensing and reflecting optical elements are condensed and directed to particular locations of the polarization conversion optical element, thereby achieving a high efficiency in polarization conversion performed by the polarization conversion optical element. In the case where the number of small condensing and reflecting elements is different among the first to third condensing and reflecting optical elements, the number of small condensing elements of the condensing optical element may be set to be twice the number of small condensing and reflecting elements of the condensing and reflecting optical element having the greatest number of small condensing and reflecting elements.

In the present invention, a superimposing optical element for superimposing the lights emerging from the polarization conversion optical element upon one another in the illumination area may be disposed on the emitting side of the polarization conversion optical element. The superimposing optical element allows the plurality of lights produced by the condensing and reflecting optical elements via the dividing process to reach the illumination area in an effective fashion, thereby allowing an improvement in the illumination efficiency.

In the present invention, an optical path changing element for changing the optical path of the light emerging from the polarization conversion optical element may be disposed on the emitting side of the polarization conversion optical element. If the optical path changing element is disposed such that the resultant illumination light is directed in a direction parallel to a plane defined by the optical axes of the two light sources having rather large sizes, then it becomes possible to reduce the size of the polarized light illumination apparatus in one direction. That is, a polarized light illumination apparatus with a small thickness can be realized. If this polarized light illumination apparatus is employed as a light source of a projector, it is possible to realize a projector with a small size.

In the present invention, the small condensing and reflecting elements of the first to third condensing and reflecting optical elements each may include a plurality of curved surface reflecting mirrors. Alternatively, the small condensing and reflecting elements of the first to third condensing and reflecting optical elements may be formed of a lens and a reflecting surface formed on the side of the lens opposite to the polarized light separating and combining element so that the lights emitted from the light sources are easily separated into a plurality of intermediate lights. If the curved surface reflecting mirrors are constructed in a decentered fashion or the lenses are constructed in a decentered fashion, it becomes possible to effectively direct the lights to the illumination area without using the superimposing optical element, and it also becomes possible to reduce the size of the polarization conversion optical element and the condensing optical element.

The polarized light illumination apparatus according to the present invention may be employed in a projector including: an optical modulator for modulating light emitted from the polarized light illumination apparatus; and a projecting optical system for projecting the light modulated by the optical modulator.

The polarized light illumination apparatus may also be employed in a projector capable of displaying a color image, wherein the projector includes: a colored-light separating optical element for separating light emitted from the polarized light illumination apparatus into a plurality of colored lights; a plurality of optical modulators for modulating the respective colored lights separated by the colored-light separating optical element; a colored-light combining optical element for combining the lights modulated by the plurality of optical modulators; and a projecting optical system for projecting the light combined by the colored-light combining optical element.

The polarized light illumination apparatus may also be employed in a projector including: a reflective optical modulator for modulating light emitted from the polarized light illumination apparatus; a polarized light separating optical element for separating a plurality of polarized light components contained in the light emitted from the polarized light illumination apparatus and in the light modulated by the reflective optical modulator, from one another; and a projecting optical system for projecting the light modulated by the reflective optical modulator and then emitted via the polarized light separating optical element.

The polarized light illumination apparatus may also be employed in a projector including: a colored-light separating optical element for separating light emitted from the polarized light illumination apparatus into a plurality of colored lights; a plurality of reflective optical modulators for modulating the respective colored lights separated by the colored-light separating optical element; a plurality of polarized light separating optical elements for separating a plurality of polarized light components contained in the colored lights separated by the colored-light separating optical element and in the colored lights modulated by the plurality of reflective optical modulators, from one another; a colored-light combining optical element for combining the lights modulated by the plurality of reflective optical modulators and then emitted via the plurality of polarized light separating optical element; and an optical projection system for projecting the light combined by the colored-light combining optical element.

As described above, if the polarized light illumination apparatus according to the present invention is employed, it is possible to realize a projector capable of forming a projected image with a high and uniform brightness. Because the polarized light illumination apparatus according to the present invention emits light with the polarization aligned in the same direction, it is particularly suitable for use in protector using a liquid crystal device as an optical modulator.

In the projector described above, it is desirable that at least one of the first and second light sources be constructed to be detachable. This allows a user to easily carry the projector by detaching one of the light sources.

Furthermore, in the projector described above, it is desirable that at least one of the first and second light sources be capable of selectively turning on. This allows only one of the light sources to be selectively turned on, for example, when the projector is driven by battery, thereby making it possible to increase the battery life. That is, it is possible to select the brightness of the projected image by turning on only one of the two light sources or both light sources, depending on the brightness in the environment or preferences of a user. More specifically, when the projector is used in a light environment, both light sources may be turned on, whereas only one of the light sources may be turned on when it is used in a dark environment.

Furthermore, in the projector described above, the first and second light sources may be different in the spectral characteristics or brightness characteristics of emitted light. This makes it possible to easily adjust the color tone of the illumination light as desired.

BRIEF DESCRIPTION OF THE DRAWINGS

FIGS. 14(A)–(C) illustrate the emission spectra of light sources of the polarized light illumination apparatus.

DETAILED DESCRIPTION OF PREFERRED EMBODIMENTS

Figure 1:
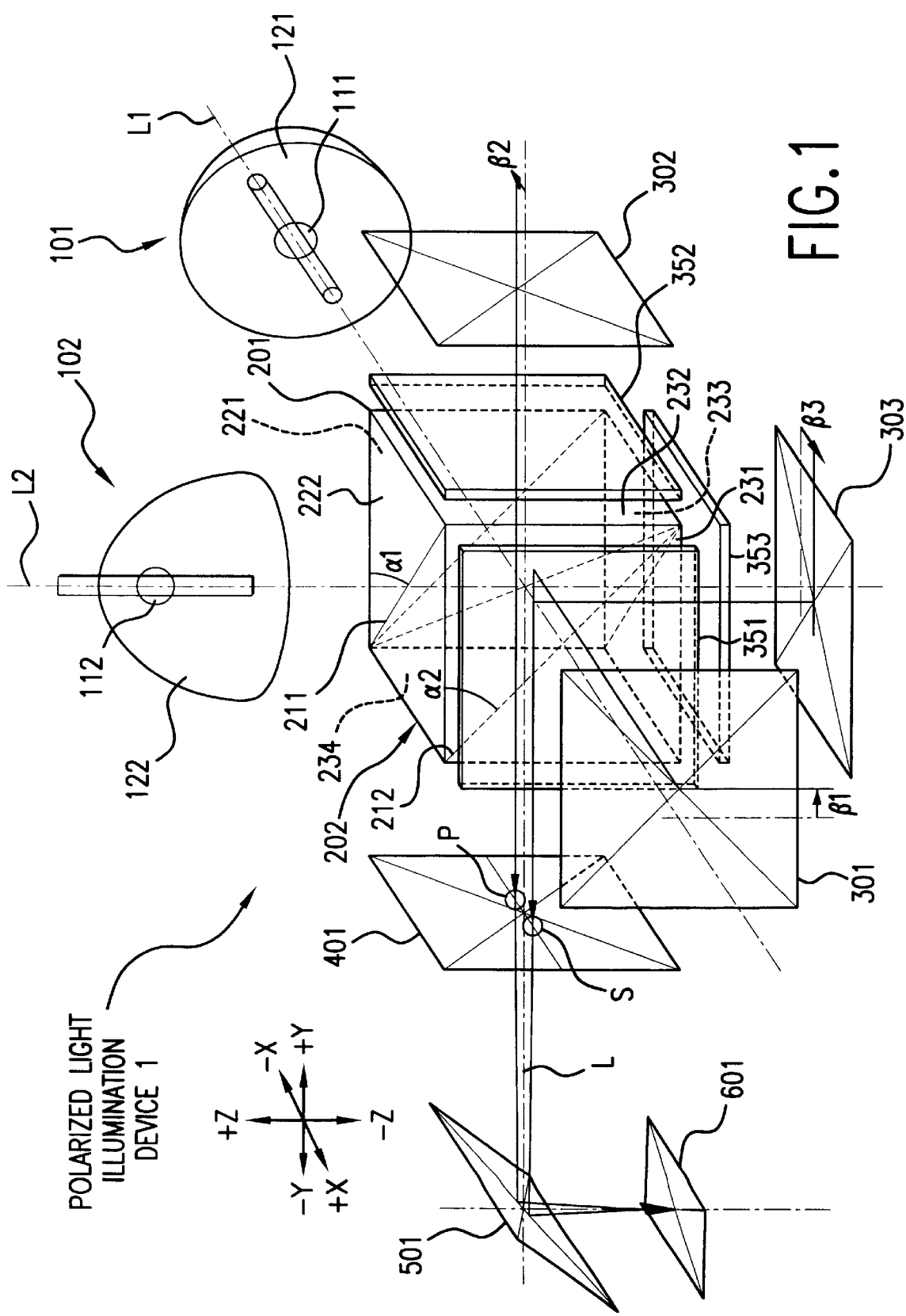
FIG. 1 is a schematic diagram of an optical system constructed to serve as a polarized light illumination apparatus according to a first embodiment of the invention.

Referring to the accompanying drawings, embodiments of the present invention are described below.

In the following description and the accompanying drawings, similar parts are denoted by similar reference numerals, and they are described only once to avoid duplicated descriptions. Three spatial axes orthogonal to one another are denoted by x, y, and z axes, respectively. Two opposite directions along the x axis are denoted by +x and −x directions, respectively. Similarly, two opposite directions along the y axis are denoted by +y and −y directions, respectively, and two opposite directions along the z axis are denoted by +z and −z directions, respectively. Furthermore, linearly polarized light having polarization axes parallel to the x, y, and z directions are referred to as z-polarized light, y-polarized light, and x-polarized light, respectively.

First Embodiment

FIG. 1 is a perspective view of a first embodiment of a polarized light illumination apparatus according to the present invention. In this first embodiment, there are provided two light sources, that is, a first light source 101 and a second light source 102, for emitting light polarized in random directions (hereinafter, such light will be referred to as randomly polarized light).

As shown in FIG. 1, the polarized light illumination apparatus of the present embodiment includes: the first light source 101; a polarized light separating and combining element 201; a first λ/4 phase plate 351 (first polarization-state conversion optical element) and a second λ/4 plate 352 (second polarization-state conversion optical element); a first condensing mirror plate 301 (first condensing and reflecting optical element) and a second condensing mirror plate 302 (second condensing and reflecting optical element); a condensing lens unit 401 (condensing optical element, polarization conversion optical element, and superimposing optical element); and a reflecting mirror 501 (optical path changing optical element), wherein these elements are disposed along the system optical axes L1 and L extending in the xy plane and intersecting each other at a right angle. Randomly polarized light emitted from the first light source 101 is first separated by the polarized light separating and combining element 201 into two types of polarized lights as will be described later, and then converted into a single type of polarized light via the first λ/4 phase plate 351, the first condensing mirror plate 301, the second λ/4 phase plate 352, the second condensing mirror plate 302, a polarized light separating and combining element 201; and the condensing lens unit 401. The resultant light is directed to a rectangular illumination area 601 via the reflecting mirror 501.

Furthermore, the second light source 102, the polarized light separating and combining element 201, a third λ/4 phase plate 353 (third polarization state converting optical element) and the second λ/4 phase plate 352, a third condensing mirror plate 303 (third condensing and reflecting optical element) and the second reflecting mirror plate 302, the condensing lens unit 401, and the reflecting mirror 501 are disposed along the system optical axes L2 and L extending in the yz plane and intersecting each other at a right angle. Randomly polarized light emitted from the second light source 102 is first separated into two types of polarized lights by the polarized light separating and combining element 201, as will be described later, and then passes through the third λ/4 phase plate 353, the third condensing mirror plate 303, the second λ/4 phase plate 352, the second condensing mirror plate 302, a polarized light separating and combining element 201; and the condensing lens unit 401, thereby converting the two types of polarized lights into a single type of polarized light. The resultant light also reaches the rectangular illumination area 601 via the reflecting mirror 501. The direction of the light after being redirected substantially by 90° by the reflecting mirror 501 is substantially parallel to the plane in which the first and second light sources 101 and 102 are located.

The optical axis L1 of the system is substantially coincident with the center axis of the light emitted from the first light source, and the optical axis L2 of the system is substantially coincident with the center axis of the light emitted from the second light source. The optical axis L of the system is substantially coincident with the center axis of the combined light emerging from the polarized light separating and combining optical element.

The first and second light sources 101 and 102 consist mainly of light source lamps 111 and 112, respectively, and parabolic reflectors 121 and 122, respectively. Randomly polarized lights emitted from the light source lamps 111 and 112 are reflected by the parabolic reflectors 121 and 122, respectively, in a single direction. As a result, the reflected lights become substantially parallel and then are incident on the polarized light separating and combining element 201. Herein, the parabolic reflectors 121 and 122 may be replaced with reflectors of another type such as an ellipsoidal reflector, a spherical reflector, etc.

The polarized light separating and combining element 201 is realized with a polarized beam splitter formed in a generally hexahedral shape including first and second polarization separating films 211 and 212 made of a dielectric multilayer film disposed in a glass prism 202. The first polarization separating film 211 is disposed at an angle to the center axis of light emitted from the first light source 101 and also at an angle $\alpha 1 = 45°$ to a first surface 221 of the polarized light separating and combining element 201. Similarly, the second polarization separating film 212 is disposed at an angle to the center axis of light emitted from the second light source 102 and also at an angle $\alpha 2 = 45°$ to a second surface 222 of the polarized light separating and combining element 201.

Figure 2:
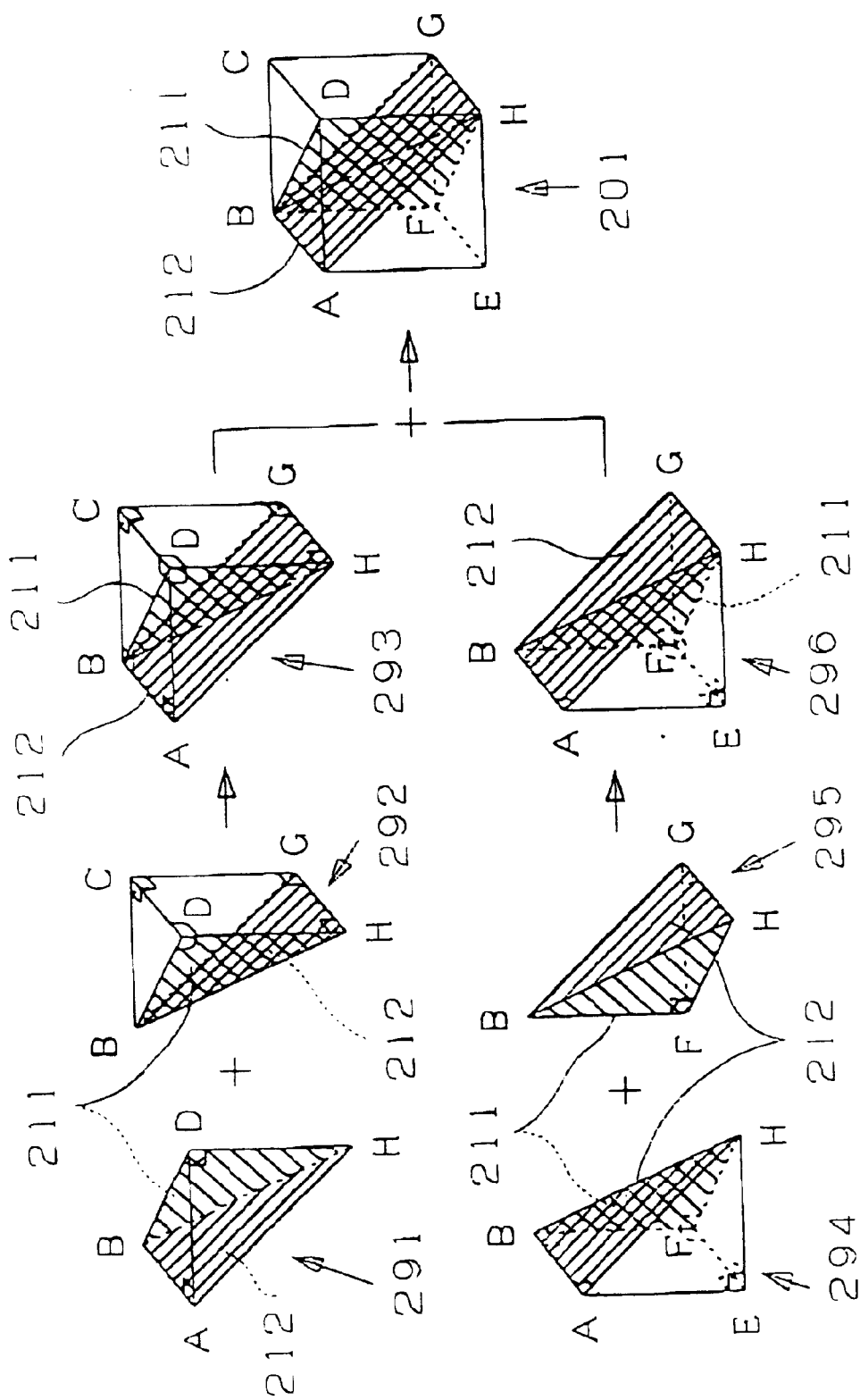
FIG. 2 is a schematic diagram illustrating the detailed structure of a polarized light separating and combining element 201.

FIG. 2 illustrates the detailed structure of the polarized light separating and combining element 201. As shown in FIG. 2, the polarized light separating and combining element 201 consists of two triangular pyramid prisms 291 and 295 and two quadrangular pyramid prisms 292 and 294.

The first polarization separating film 211 is disposed at the interface between a side face BDH of the first triangular pyramid prism 291 and a side face BDH of the first quadrangular pyramid prism 292 and also at the interface between a side face BFH of the second quadrangular pyramid prism 294 and a side face BFH of the second triangular pyramid prism 295. More specifically, the first polarization separating film 211 may be formed by evaporating a dielectric multilayer film on either one of the side face BDH of the first triangular pyramid prism 291 or the side face BDH of the first quadrangular pyramid prism 292 and also on either one of the side face BFH of the second quadrangular pyramid prism 294 or the side face BFH of the second triangular pyramid prism. That is, either one of the side face BDH of the first triangular pyramid prism 291 or the side face BDH of the first quadrangular pyramid prism 292 may be employed as a surface on which the first polarization separating film 211 is formed. Similarly, either one of the side face BFH of second quadrangular pyramid prism 294 or the side face BFH of the second triangular pyramid prism 295 may be employed as a surface on which the first polarization separating film 211 is formed. However, it is desirable that the first polarization separating film 211 formed on the two prisms be flat. To meet this requirement, it is desirable to form the first polarization separating film 211 on the side face BDH of the first triangular pyramid prism 291 and the side face BFH of the second quadrangular pyramid prism 294, or on the side face BDH of the first quadrangular pyramid prism 292 and the side face BFH of the second triangular pyramid prism 295.

Similarly, the second polarization separating film 212 is disposed at the interface between a side face ABH of the first triangular pyramid prism 291 and a side face ABH of the second quadrangular pyramid prism 294 and also at the interface between a side face BGH of the first quadrangular pyramid prism 292 and a side face BGH of the second triangular pyramid prism 295. The second polarization separating film 212 may be formed by evaporating a dielectric multilayer film on either one of the side face ABH of the first triangular pyramid prism 291 or the side face ABH of the second quadrangular pyramid prism 294 and also either one of the side face BGH of the first quadrangular pyramid prism 292 or the side face BGH of the second triangular pyramid prism 295. That is, either one of the side face ABH of the first triangular pyramid prism 291 or the side face ABH of the second quadrangular pyramid prism 294 may be employed as a surface on which the second polarization separating film 212 is formed. Similarly, either one of the side face BGH of the first quadrangular pyramid prism 292 or the side face BGH of the second triangular pyramid prism 295 may be employed as a surface on which the second polarization separating film 212 is formed. However, it is desirable that the second polarization separating film 212 formed on the two prisms be flat. To meet this requirement, it is desirable to form the second polarization separating film 212 on the side face ABH of the first triangular pyramid prism 291 and the side face BGH of the first quadrangular pyramid prism 292, or on the side face ABH of the second quadrangular pyramid prism 294 and the side face BGH of the second triangular pyramid prism 295.

The side face BDH of the first triangular pyramid prism 291 and the side face BDH, on which the first polarization separating film 211 is formed, of the first quadrangular pyramid prism 292 are adhesively bonded to each other thereby forming a first prism assembly 293. Similarly, the side face BFH of the second quadrangular pyramid prism 294 and the side face BFH, on which the first polarization separating film 211 is formed, of the second triangular pyramid prism 295 are adhesively bonded to each other thereby forming a second prism assembly 296. Finally, the two prism assemblies are combined together by adhesively bonding their side faces ABGH to each other wherein the second polarization separating film 212 is formed on one of the side faces ABGH, thereby obtaining the polarized light separating and combining element 201 in a complete form. The above-described procedure of assembling the four prisms is merely an example, and the four prisms may also be assembled according to a different procedure.

Referring again to FIG. 1, the first $\lambda/4$ phase plate 351 is disposed at the side of the third surface 231 of the polarized light separating and combining element 201 such that the first $\lambda/4$ phase plate 351 opposes the third surface 231. Furthermore, the first condensing mirror plate 301 is disposed at the outer side of the $\lambda/4$ phase plate 351. In this embodiment, the first $\lambda/4$ phase plate 351 and the first condensing mirror plate 301 are substantially parallel to the third surface 231. On the side of a fourth surface 232 of the polarized light separating and combining element 201, the second $\lambda/4$ phase plate 352 is disposed at a location opposing the fourth surface 232 of the polarized light separating and combining element 201, and the second condensing mirror plate 302 is disposed at the outer side of the second λ/4 phase plate 352. In this embodiment, the second λ/4 phase plate 352 and the second condensing mirror plate 302 are disposed such that they become substantially parallel to the fourth surface 232. On the side of a fifth surface 233 of the polarized light separating and combining element 201, the third λ/4 phase plate 353 is disposed at a location opposing the fifth surface 233 of the polarized light separating and combining element 201, and the third condensing mirror plate 303 is disposed at the outer side of the third λ/4 phase plate 353. In this embodiment, the third λ/4 phase plate 353 and the third condensing mirror plate 302 are disposed such that they become substantially parallel to the fifth surface 233. The structure of the first to third condensing mirror plates 301, 302 and 303 will be described in detail later. In FIG. 1, for ease of a visual understanding, the first to third λ/4 phase plates 351, 352, and 353 are spaced from the polarized light separating and combining element 201. However, in practice, it is desirable that they be in close contact with the polarized light separating and combining element 201.

At the side of a sixth surface 234 of the polarized light separating and combining element 201, a condensing lens plate 411, which includes, as will be described in detail later, a λ/2 phase plate 421 (polarization conversion optical element) and a superimposing lens 431 (superimposing optical element), is disposed such that it faces in a direction substantially perpendicular to the optical axis L of the system.

Figure 3:
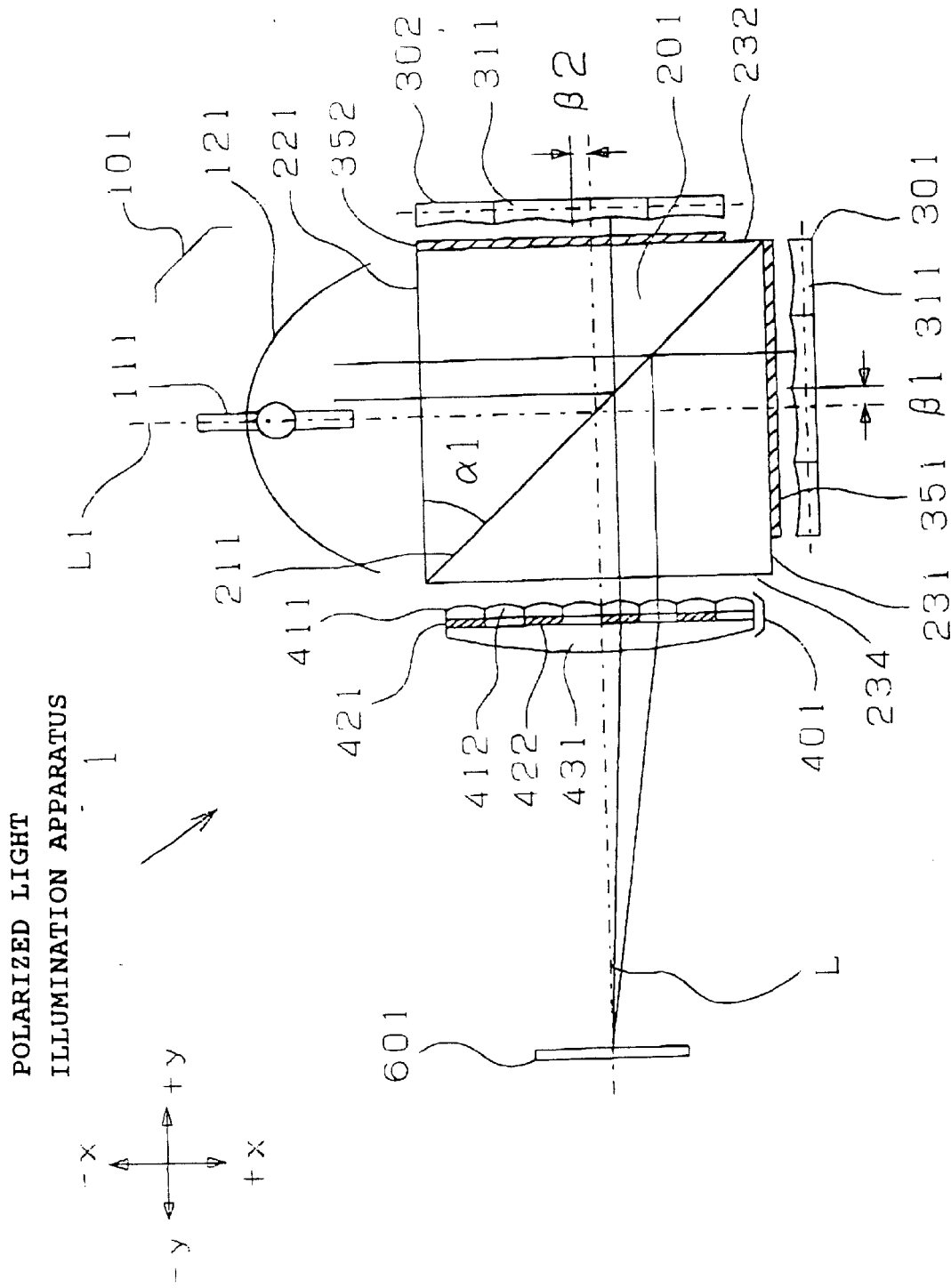
FIG. 3 is a schematic diagram illustrating the basic construction of the optical system constructed to serve as the polarized light illumination apparatus according to the first embodiment of the invention.

In the polarized light illumination apparatus 1 constructed in the above-described manner, randomly polarized light emitted from the first light source 101 is separated into two types of polarized lights and directed to the condensing lens plate 401 via a process described below. FIG. 3 is a cross-sectional view of FIG. 1, taken in the xy plane.

Figure 9:
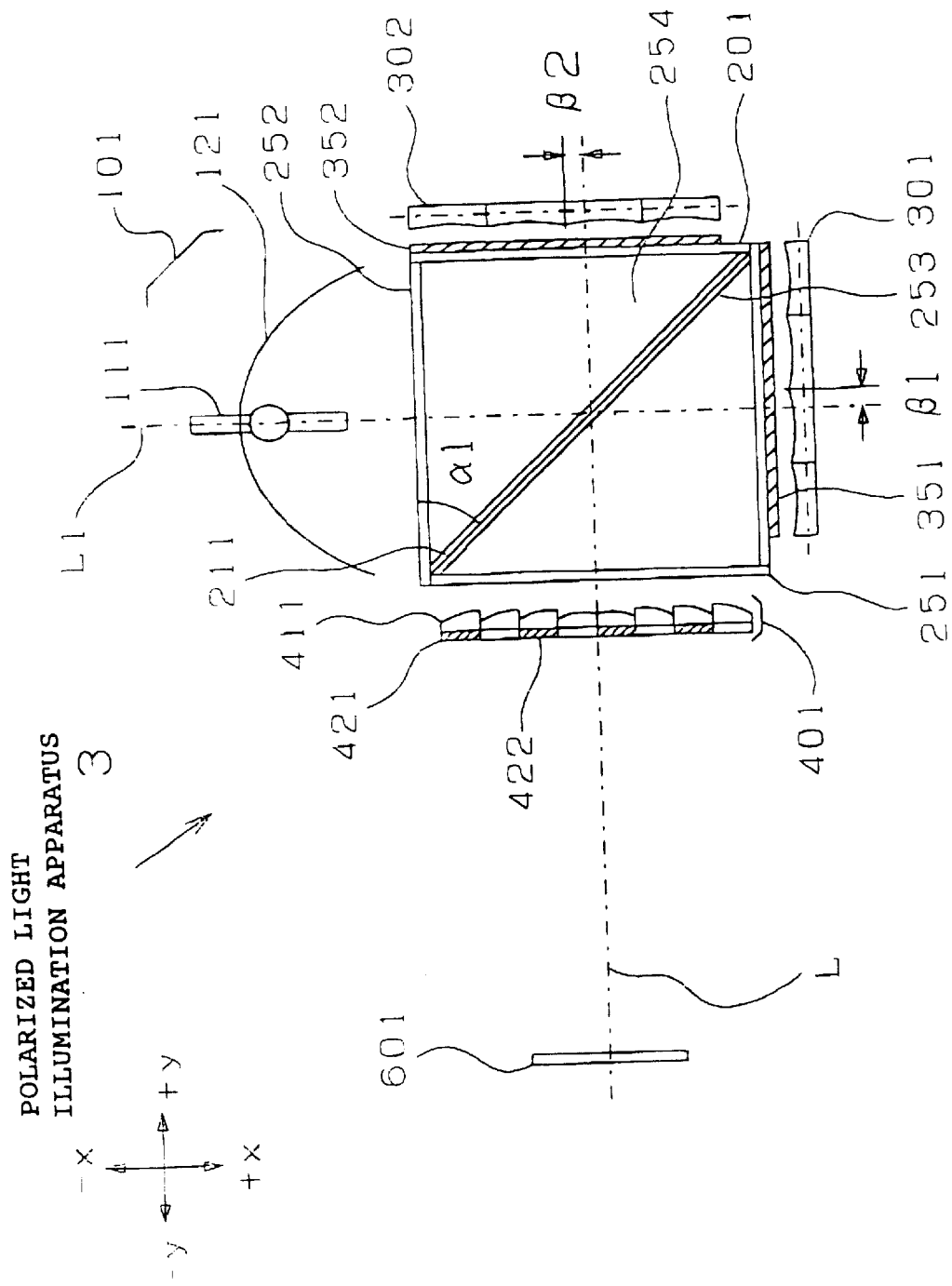
FIG. 9 is a schematic diagram illustrating the basic construction of an optical system constructed to serve as a polarized light illumination apparatus according to a third embodiment of the invention.
Figure 10:
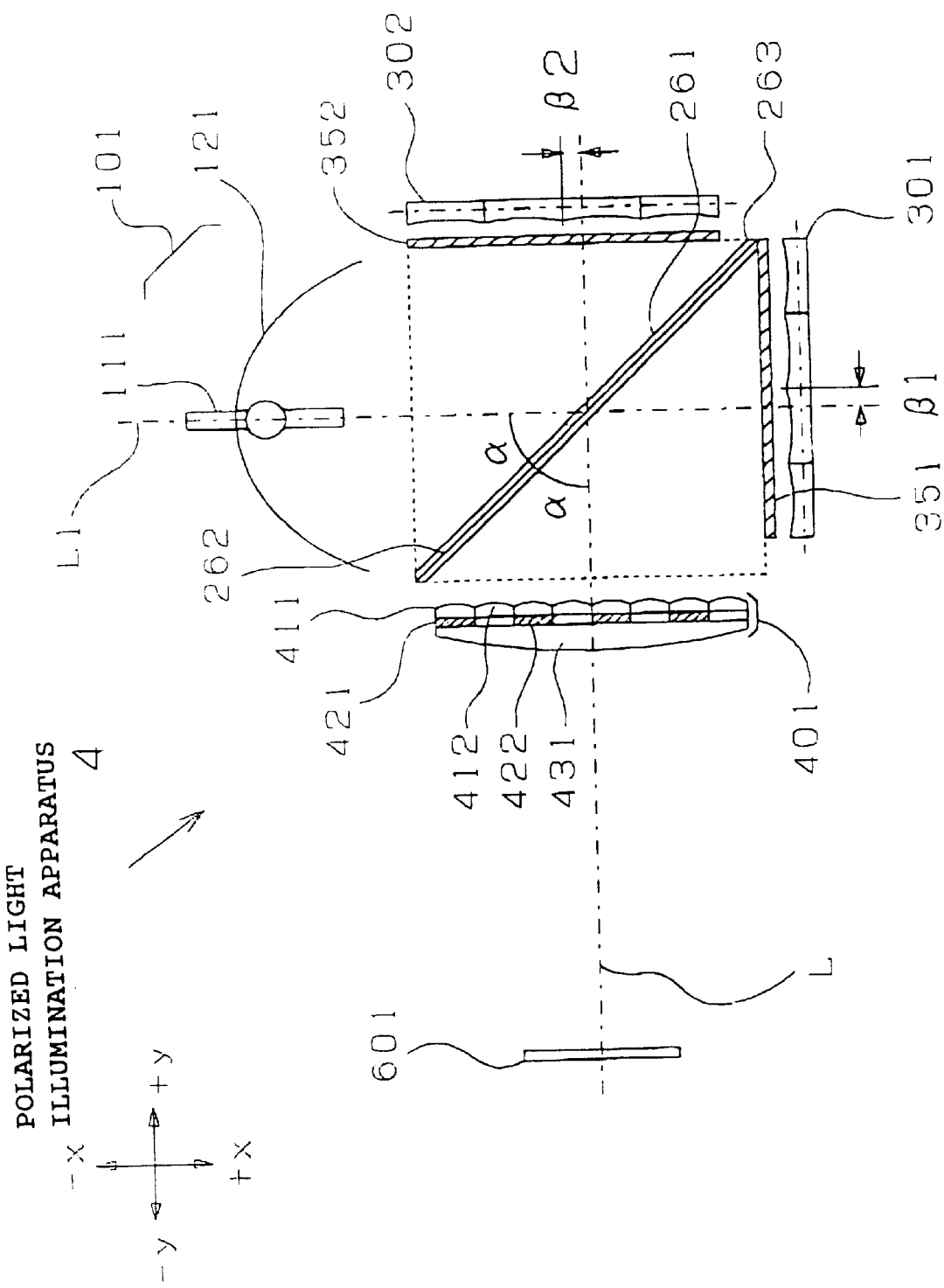
FIG. 10 is a schematic diagram illustrating the basic construction of an optical system constructed to serve as a polarized light illumination apparatus according to a fourth embodiment of the invention.

The reflecting mirror 501 is not shown in FIG. 3, because it is not concerned with the present process. Thus, the optical path from the condensing lens unit 401 to the illumination area 601 is represented as being straight. FIGS. 9 and 10 which will be described later are also drawn in a similar manner.

The randomly polarized light emitted from the first light source 101 can be regarded as a mixed light of a linearly polarized light polarized in a direction parallel to the incidence plane (xy plane) of the first polarization light separating film 211, and a linearly polarized light polarized in a direction perpendicular to the incidence plane (xy plane) of the first polarization separating film 211. After being emitted from the first light source 101, if the mixed light is incident on the first surface 221 of the polarized light separating and combining element 201, the mixed light is separated by the first polarization separating film 211 into two types of polarized lights, that is, y-polarized light and z-polarized light. Herein, the first polarization separating film 211 transmits the y-polarized light which is a linearly polarized light polarized in a direction parallel to the incidence plane (xy plane) of the first polarization separating film, whereas the first polarization separating film 211 reflects the z-polarized light which is a linearly polarized light polarized in a direction perpendicular to the first polarization separating film 211. More specifically, the y-polarized light contained in the randomly polarized light passes through the first polarized light separating film 211 and travels toward the third surface 231. On the other hand, the z-polarized light is reflected by the polarization separating film 211 toward the fourth surface 232 of the polarized light separating and combining element 201. The polarization separating film 211 employed herein is widely known as a polarization separating film which transmits a P-polarized light and reflects an S-polarized light. The two types of polarized lights separated by the polarized light separating and combining element 201 pass through the first and second λ/4 phase plates 351 and 352, respectively, and then are reflected by the first and second condensing mirror plates 301 and 302, respectively.

Figure 4:
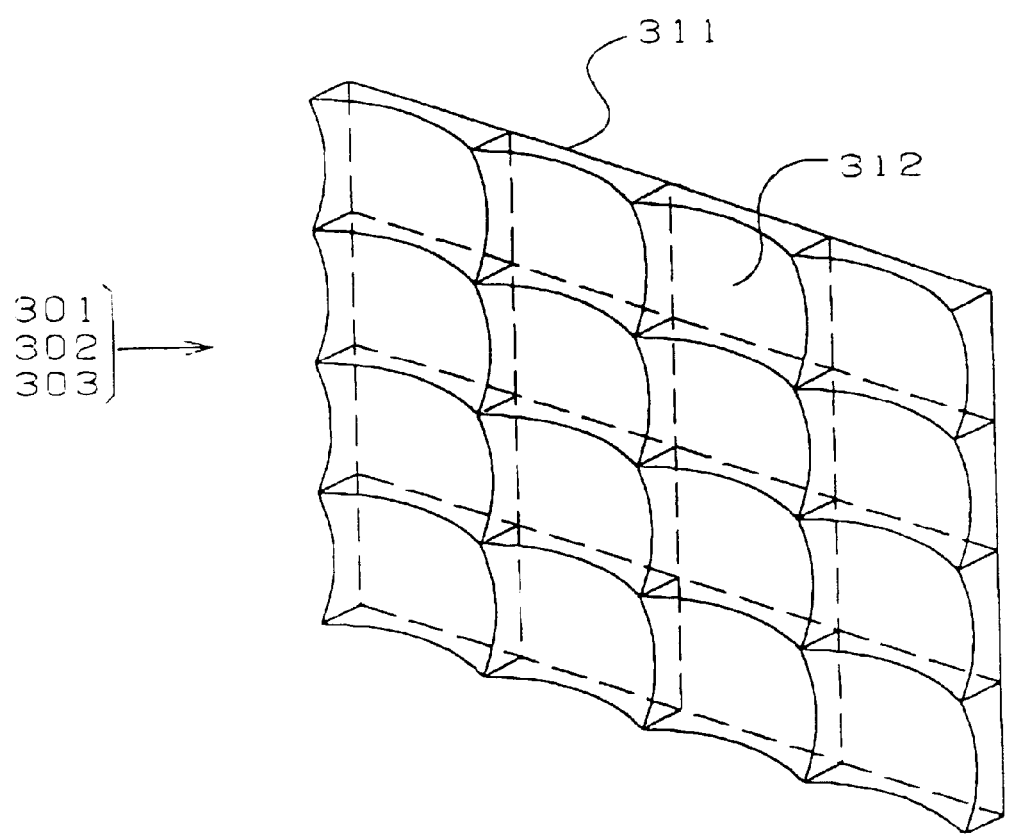
FIG. 4 is a perspective view of a condensing mirror plate used in the polarized light illumination apparatus shown in FIG. 1.

The condensing mirror plates 301 and 302 each include, as shown in FIG. 4, a plurality of small condensing mirrors 311 each having the same rectangular shape and arranged in a matrix, wherein each small condensing mirror is geometrically similar to the illumination area 601. A reflecting surface 312 formed of an aluminum film or a dielectric multilayer film is disposed on the surface of each condensing mirror plate. In this embodiment, the reflecting surface 312 of each small condensing mirror 311 is formed in a spherical shape. However, the reflecting surface 312 may also have another curvature. For example, a paraboloidal surface, an ellipsoidal surface, or a toric surface may also be employed depending on the characteristics of the incident light emitted from the first and second light sources 101 and 102. The third condensing mirror plate 303 which will be described later also has a similar structure.

Figure 5:
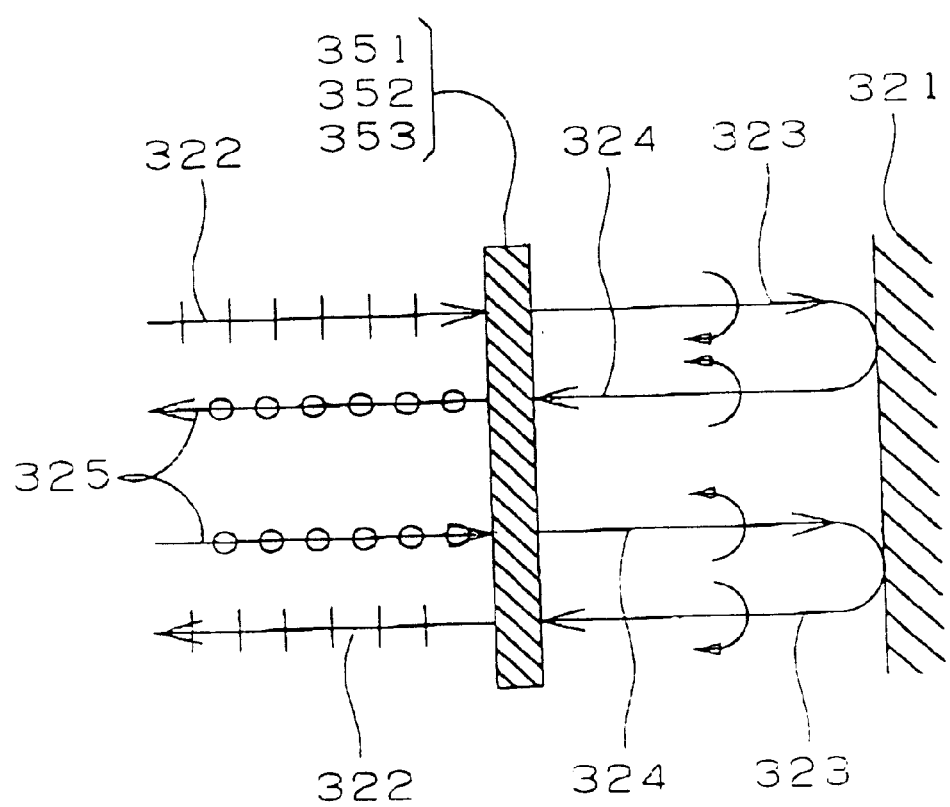
FIG. 5 is a schematic diagram illustrating a polarizing process performed in the polarized light illumination apparatus shown in FIG. 1.

The y-polarized light and the z-polarized light separated by the first polarization separating film 211 pass through the first and second λ/4 phase plates 351 and 352, respectively, and then are reflected by the first and second condensing mirror plates 301 and 302, respectively. When they again pass through the λ/4 phase plates 351 and 352, the traveling direction of each polarized light is changed by substantially 180° and the polarization direction is rotated by substantially 90°. This process is described in further detail below with reference to FIG. 5. Note that, for simplicity of illustration, the condensing mirror plates 301 and 302 are represented as if they were formed in a flat-plate shape. The y-polarized light 322 incident on the λ/4 phase plate 351 is converted by the λ/4 phase plate 351 to a clockwise-rotating circularly polarized light 323 (note that the y-polarized light 322 can be converted to a counterclockwise-rotating light depending on the manner in which the λ/4 phase plate 351 is disposed). The resultant light 323 travels to the mirror plate 321. When the light is reflected by the mirror plate 321, the rotation direction of the polarization axis is changed. More specifically, clockwise-rotating circularly polarized light is converted to counterclockwise-rotating circularly polarized light (counterclockwise-rotating circularly polarized light is converted to clockwise-rotating circularly polarized light). Thus, the traveling direction of the light 323 is converted by the mirror plate 321 by substantially 180° and the light 323 becomes a counterclockwise-rotating circularly polarized light 324. The resultant light 324 again passes through the λ/4 phase plates 351 and 352 and is converted to z-polarized light 325 when it passes through these λ/4 phase plates. The y-polarized light 325 incident on the λ/4 phase plate 352 is converted by the λ/4 phase plate to a counterclockwise-rotating circularly polarized light 324 (note that the y-polarized light 325 can be converted to a clockwise-rotating light depending on the manner in which the λ/4 phase plate is disposed). The resultant light 324 travels to the mirror plate 321. When the light is reflected by the mirror plate 321, the rotation direction of the polarization axis is changed. More specifically, clockwise-rotating circularly polarized light is converted to counterclockwise-rotating circularly polarized light (counterclockwise-rotating circularly polarized light is converted to clockwise-rotating circularly polarized light). Thus, the traveling direction of the light 324 is converted by the mirror plate 321 by substantially 180° and the light 324 becomes a clockwise-rotating circularly polarized light 323. The resultant light 323 again passes through the λ/4 phase plate 352 and is converted to an x-polarized light 322 when it passes through the λ/4 phase plate 352.

Referring again to FIG. 3, when the y-polarized light reaches the third surface 231, its traveling direction is converted by substantially 180° and its polarization is converted to z-polarization by the first λ/4 phase plate 351 and the first condensing mirror plate 301. The resultant light is then reflected by the first polarization separating film 211 toward the sixth surface 234. On the other hand, the z-polarized light which has reached the fourth surface 232 is converted in terms of the traveling direction by substantially 180° and in terms of the polarization into x-polarization by the second λ/4 phase plates 352 and the second condensing mirror plate 302. This time, the resultant x-polarized light passes through the first polarization separating film 211 and travels toward the sixth surface 234. That is, the first polarization separating film 211 also serves as a polarization combining film, and thus the optical elements serves as a polarized light separating and combining optical element.

Because the first and second condensing mirror plates 301 and 302 each include small condensing mirrors 311 having the capability of condensing light, the traveling direction of the polarized light is reversed, and as many condensed images are formed as there are small condensing mirrors 311 forming the condensing mirror plates 301 and 302. These condensed images are images of the light source. Thus, hereinafter, the condensed images will be referred to as secondary light source images. In the polarized light illumination apparatus 1 of the present embodiment, the condensing lens unit 401 is disposed at a location where the secondary light source images are formed.

The first condensing mirror plate 301 is disposed such that the first condensing mirror plate 301 is shifted in the +y direction until the center of the first condensing mirror plate 301 is apart from the x axis by β1. The second condensing mirror plate 302 is disposed such that the second condensing mirror plate 302 is shifted in the −x direction until the center of the second condensing mirror plate 302 is apart from the y axis by β2.

Because the respective condensing mirror plates are disposed at locations deviated from the x or y axis, the center axis of the z-polarized light which is incident on the condensing lens unit 401 after being reflected by the small condensing mirror 311 of the first condensing mirror plate 301 becomes parallel to the center axis of the x-polarized light which is incident on the condensing lens unit 401 after being reflected by the small condensing mirror 311 of the second condensing mirror plate 302, and they do not overlap each other. The secondary light source images of the z-polarized light formed by the first condensing mirror plate 301 and the secondary light source images of the x-polarized light formed by the second condensing mirror plate 302 are formed at locations slightly deviated in the x direction from each other, as conceptually represented by S1 and P1 in FIG. 1.

In the polarized light illumination apparatus 1, the process in which the randomly polarized light emitted from the second light source 102 is separated into two types of polarized lights and directed to the condensing lens plate 401 is described below with reference to FIG. 1.

The randomly polarized light emitted from the second light source 101 102 can be regarded as a mixed light of linearly polarized light polarized in a direction parallel to the incidence plane (yz plane) of the second polarization separating film 212 and a linearly polarized light polarized in a direction perpendicular to the incidence plane (yz plane) of the second polarization separating film 212.

After being emitted from the second light source 102, if the mixed light is incident on the first surface 221 of the polarized light separating and combining element 201, the mixed light is separated by the second polarization separating film 212 into two types of polarized lights, that is, x-polarized light and z-polarized light. Herein, unlike the first polarization separating film 211, the second polarization separating film 212 reflects the z-polarized light which is a linearly polarized light polarized in a direction parallel to the incidence plane (yz plane) of the second polarization separating film, whereas the second polarization separating film 212 transmits the x-polarized light which is a linearly polarized light polarized in a direction perpendicular to the second polarization separating film 212. More specifically, the x-polarized light contained in the randomly polarized light passes through the first polarization separating film 211 and travels toward the third surface 231. On the other hand, the z-polarized light is reflected by the first polarization separating film 211 toward the fourth surface 232 of the polarized light separating and combining element 201. Such a polarization separating film which reflects a P-polarized light polarized in a direction parallel to the incidence plate and reflects an S-polarized light polarized in a direction perpendicular to the incidence plane is called an FTIR (frustrated total internal reflection) Elm. It is known to produce an FTIR film with a dielectric multilayer film formed on a substrate by properly selecting the material for the substrate, the material of the multilayer film, and the structure of the multilayer film. Because the FTIR film is well known, a further description is not given here.

The z-polarized light and the x-polarized light separated by the second polarization separating film 212 pass through the second and λ/4 phase plates 352 and 353, respectively, and then are reflected by the second and third condensing mirror plates 302 and 303, respectively. After that, they again pass through the λ/4 phase plates 352 and 353. This causes the traveling direction of the polarized lights to be changed by substantially 180° and the polarization direction to be rotated by substantially 90°. This process occurs in a similar manner as described above with reference to FIG. 5.

Thus, the z-polarized light which has reached the fourth surface 232 is converted in terms of the traveling direction by substantially 180° and in terms of the polarization into x-polarization by the second λ/4 phase plate 352 and the second condensing mirror plate 302. The resultant x-polarized light passes through the second polarization separating film 212 and travels toward the sixth surface 234. On the other hand, the x-polarized light which has reached the fifth surface 233 is converted in terms of the traveling direction by substantially 180° and in terms of the polarization into y-polarization by the third λ/4 phase plates 353 and the third condensing mirror plate 303. The resultant light is then reflected by the second polarization separating film 212 and becomes a z-polarized light. The z-polarized light travels toward the sixth surface 234.

Because the second and third condensing mirror plates 302 and 303 each include small condensing mirrors 311 having the capability of condensing light as described above, the traveling direction of the polarized light is reversed, and as many condensed images are formed as there are small condensing mirrors 311 forming the condensing mirror plates 302 and 303.

The second condensing mirror plate 302 is disposed such that the second condensing mirror plate 302 is shifted in the −x direction until the center of the second condensing mirror plate 302 is apart from the y axis by β2. The third condensing mirror plate 303 is disposed such that the third condensing mirror plate 303 is shifted in the +x direction until the center of the third condensing mirror plate 303 is apart from the y axis by β3.

Thus, the center axis of the x-polarized light which is incident on the condensing lens unit 401 after being reflected by the small condensing mirrors 311 of the second condensing mirror plate 302 and the center axis of the z-polarized light which is incident on the condensing lens unit 401 after being reflected by the small condensing mirrors 311 of the third condensing mirror plate 303 are parallel to each other and they do not overlap each other. That is, secondary light source images associated with the x-polarized lights formed by the first condensing mirror plate 302 and secondary light source images associated with the z-polarized lights formed by the third condensing mirror plate 303 are formed at locations slightly deviated from each other in the x-direction. Herein, the secondary light source images formed by the two types of polarized lights (the secondary light source images formed by the z-polarized lights and the secondary light source images formed by the x-polarized lights) are superimposed upon the corresponding secondary light source images formed by the lights emitted from the first light source 101, wherein the secondary light source images formed by the lights polarized in the same directions are superimposed on each other. More specifically, the secondary light source images of the z-polarized lights originating from the light emitted from the first light source 101 and formed via the first polarization separating film 211, the first λ/4 phase plate 351, and the first condensing mirror plate 301 and the secondary light source images of the z-polarized lights originating from the light emitted from the second light source 102 and formed via the second polarization separating film 212, the third λ/4 phase plate 353, and the third condensing mirror plate 303 are formed at the same location S1 in a superimposed fashion, as conceptually represented in FIG. 1. Similarly, the secondary light source images of the x-polarized lights originating from the light emitted from the first light source and formed via the first polarization separating film 211, the second λ/4 phase plate 352, and the second condensing mirror plate 302 and the secondary light source images of the x-polarized lights originating from the light emitted from the second light source and formed via the second polarization separating film 212, the second λ/4 phase plate 352, and the second condensing mirror plate 302 are formed at the same location P1 in a superimposed fashion, as conceptually represented in FIG. 1. To this end, shifting distance β3 of the third condensing mirror plate is set to be equal to β1.

The process in which the polarization of the light supplied to the condensing lens unit 401 is aligned in the same direction and the resultant light finally reaches the illumination area 601 is described below.

Figure 6:
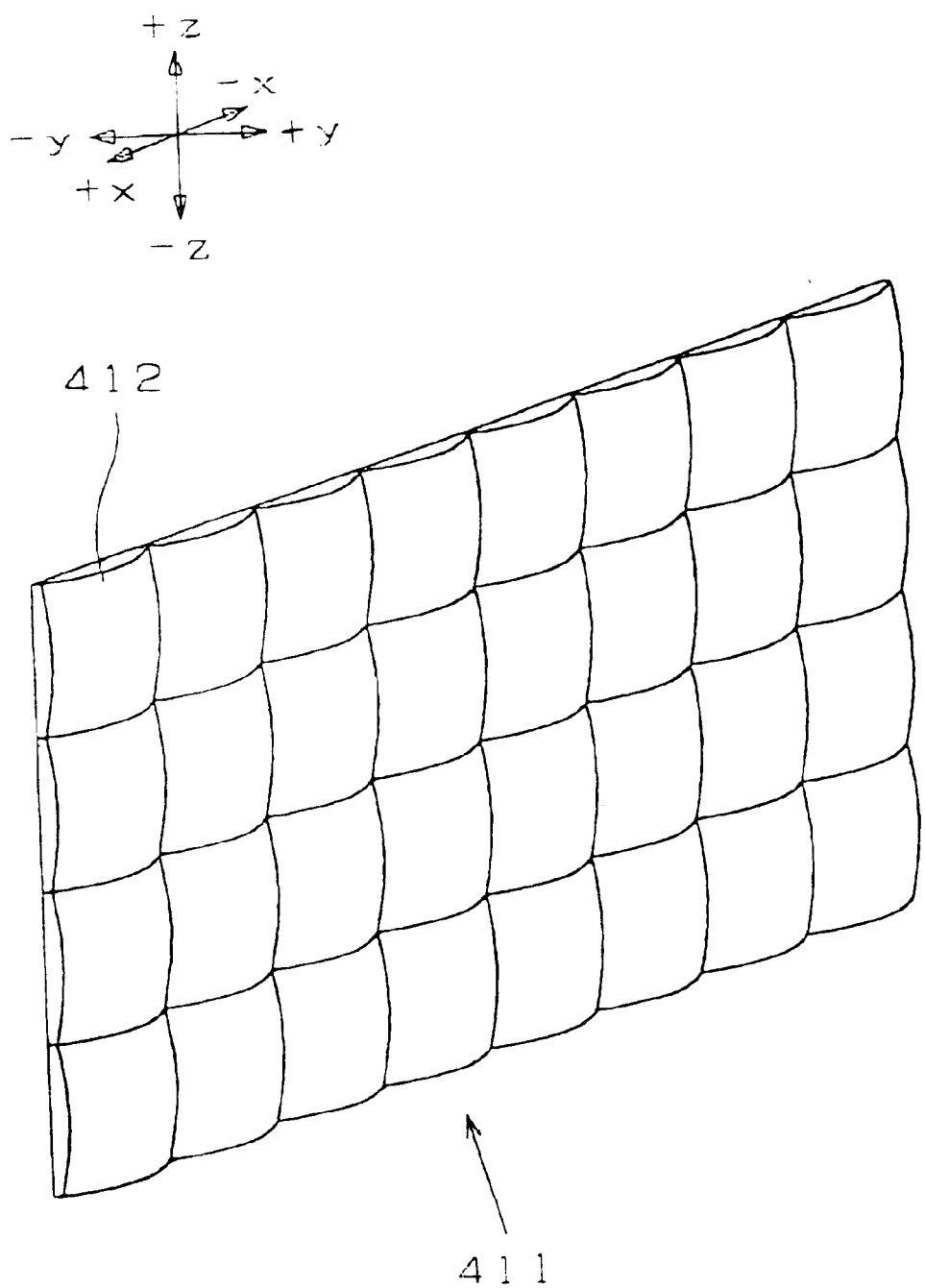
FIG. 6 is a perspective view of a lens plate used in the polarized light illumination apparatus shown in FIG. 1.

FIG. 6 illustrates the appearance of the condensing lens plate 411 of the condensing lens unit 401. As shown in FIG. 6, the condensing lens plate 411 includes a plurality of rectangular small lenses 412. Herein, the number of small lenses 412 is equal to twice the number of small condensing mirrors 311 forming the first to third condensing mirror plates 301, 302, and 303. In the case where the number of small condensing mirrors 311 is different among the first to third condensing mirror plates 301, 302, and 303, the number of small lenses 412 of the condensing lens plate 411 may be set to twice the number of small condensing mirrors of the condensing mirror plate having the greatest number of small condensing mirrors.

Figure 7:
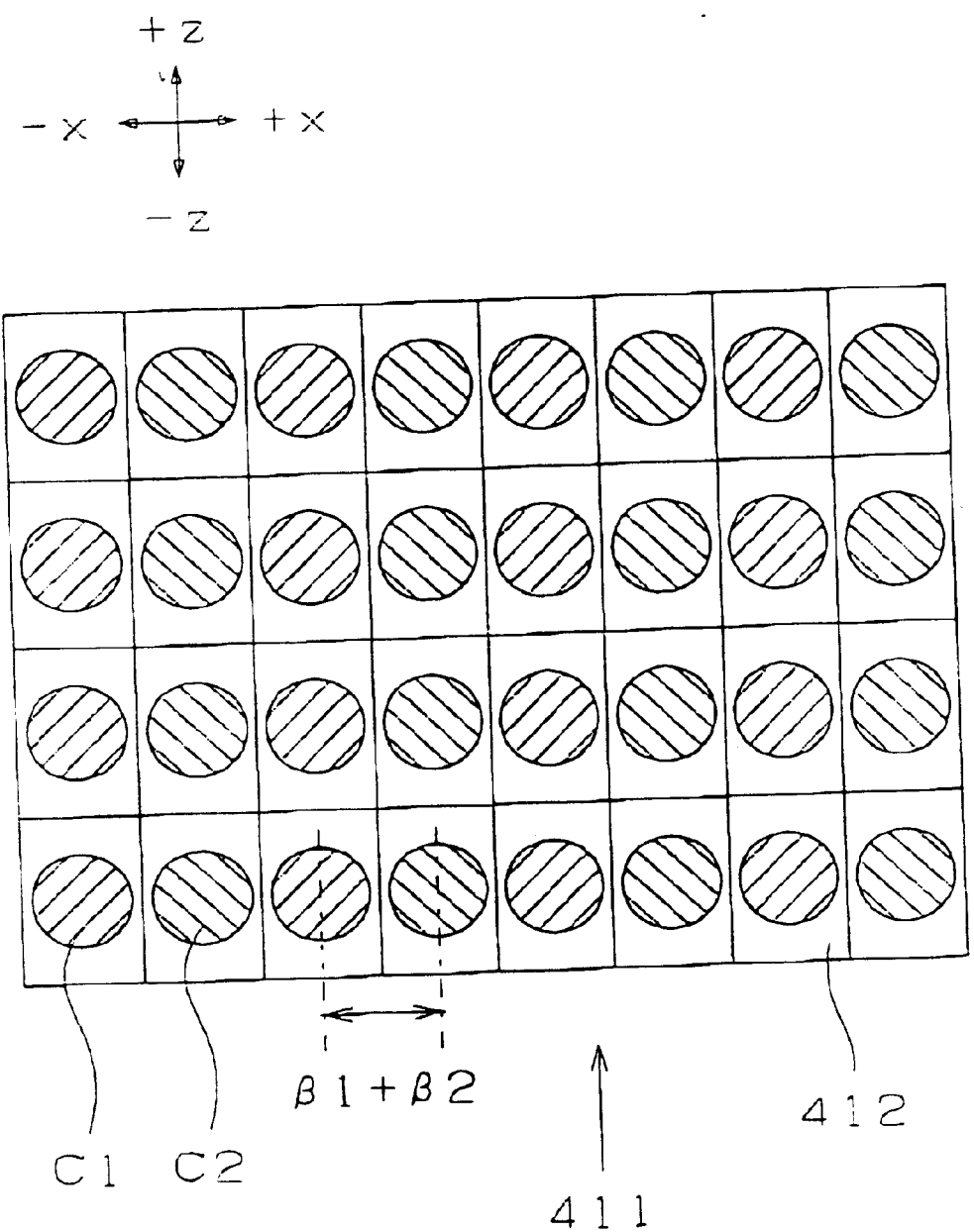
FIG. 7 is a schematic diagram illustrating locations where secondary light source images are formed on the condensing lens plate of the polarized light illumination apparatus shown in FIG. 1.

In the present embodiment, the secondary light source images formed by the x-polarized lights are spaced β1+β2 apart from the secondary light source images formed by the z-polarized lights. FIG. 7 illustrates the secondary light source images formed by two types of polarized lights upon the condensing lens plate 411, seen from the side of the illumination area 601. The secondary light source images C1 (circular images shaded with lines diagonally extending from the left and bottom to the right and top) formed by the x-polarized lights and the secondary light source images C2 (circular images shaded with lines diagonally extending from the right and bottom to the left and top) formed by the z-polarized lights are alternately located in the x direction at intervals of β1+β2. The λ/2 phase plate 421, on which the phase layer 422 is selectively formed at locations corresponding to the locations where the secondary light source images C1 of the x-polarized lights are formed, are disposed on the side, facing the illumination area 601, of the condensing lens plate 411 so that the x-polarized lights undergo rotation of polarization direction when they pass through the phase layer 422, thereby converting the x-polarized lights into z-polarized lights. On the other hand, the z-polarized lights do not pass through the phase layer 422 but they directly pass through the λ/2 phase plate 421 without undergoing rotation of the polarization direction. As a result, almost all of the lights become z-polarized light after passing through the condensing lens unit 401.

The lights whose polarization is aligned into the z direction via the above-described process are superimposed by the superimposing lens 431 disposed on the side, facing the illumination area 601, of the λ/2 phase plate 421, upon one another at a single location in the illumination area 601. In this case, after the traveling direction of the illumination light is bent by substantially 90° by the reflecting mirror 501 disposed between the superimposing lens 431 and the illumination area 601, the illumination light reaches the illumination area 601. More specifically, the plurality of images formed by the small condensing mirrors 311 of the first to third condensing mirror plates 301, 302, and 303 are superimposed by the condensing lens plate 411 and the superimposing lens 431 into a single image at the same location, and the state of polarization becomes the same when the light passes through the λ/2 phase plate 421. Thus, almost all lights finally reach the illumination area 601. Thus, the illumination area 601 is illuminated with one type of light polarized in substantially the same direction. Because the illumination area 601 is illuminated with the plurality of secondary light source images, the variation in the illumination intensity is very small. That is, all of the illumination area is uniformly illuminated.

In the polarized light illumination apparatus 1 of the present embodiment, as described above, randomly polarized lights emitted from the first and second light source 101 and 102 are first separated by the polarized light separating and combining element 201 into two types of polarized lights, and then the two types of polarized lights are introduced into predetermined parts of the λ/2 phase plate 421 so that polarization is aligned into the single same direction. Thus, the randomly polarized lights emitted from the first and second light sources 101 and 102 are combined into a single type of polarized light whose polarization is aligned into the same single direction without producing a significant loss, whereby the illumination area 601 is illuminated brightly.

Even though two light sources 101 and 102 are used, the illumination lights emitted from the two light sources 101 and 102 can be combined together without causing an increase in the incident angle (illumination angle) of the illumination lights to the illumination area. This means that the illumination light has the same cross section as obtained when only one light source is used. Thus, the amount of light per unit area can be increased to a level approximately twice greater than can be obtained with a single light source. Furthermore, the two light sources, that is, the first and second light sources 101 and 102 can both be disposed in the xz plane. In this case, the reflecting mirror 501 is disposed such that the traveling direction of the illumination light emitted through the condensing lens unit 401 is changed by the reflecting mirror 501 so that the illumination light is emitted in a direction parallel to the xz plane in which the two light sources are disposed. This allows the illumination apparatus to be formed in a small shape in height or depth. That is, the reflecting mirror 501 disposed at the stage following the condensing lens unit 401 makes it possible to design the polarized light illumination apparatus with a small size in a more flexible fashion.

To introduce the two types of polarized lights into the predetermined parts of the $\lambda/2$ phase plate 421, the polarized light separating and combining element 201 is required to have high polarized light separation performance. In the present embodiment, to meet the above requirement, polarized light separating and combining element 201 is formed using a glass prism and a dielectric multilayer film so that it is thermally stable in the polarized light separation performance. Thus, even when this polarized light separating and combining element 201 is used in an illumination apparatus required to output a high optical power, the polarized light separating and combining element 201 can provide stable polarized light separation performance. Therefore, it is possible to realize a polarized light illumination apparatus having desired high performance.

Furthermore, in the present embodiment, the small condensing mirrors 311 of the first to third condensing mirror plates 301, 302, and 303 are formed in a rectangular shape longer in the horizontal direction than in the vertical direction to fit the rectangular shape of the illumination area 601 (that is, the small condensing mirrors are formed to have a substantially similar shape to that of the illumination area), and the direction in which the two types of polarized lights emitted from the polarized light separating and combining element 201 are separated (that is, the direction in which the secondary light source images formed by the two types of polarized lights are aligned) is set to be horizontal (in the x direction) to fit the shape of the illumination area 601. This makes it possible to achieve a high illumination efficiency without wasting light even when the illumination area 601 has a rectangular shape longer in the horizontal direction than in the vertical direction.

Furthermore, the center axis of the z-polarized light which is incident on the condensing lens unit 401 after being reflected by the small condensing and reflecting elements of the first condensing mirror plate 301 and the third condensing mirror plate 303 is parallel to the center axis of the x-polarized light which is incident on the condensing lens unit 401 after being reflected by the small condensing and reflecting elements of the second condensing mirror plate. This means that lights reflected by the small condensing and reflecting elements of the first to third condensing and reflecting optical elements are incident at substantially the same angle upon the polarized light separating and combining element 201. Therefore, even when the polarized light separating and combining characteristics of the polarized light separating and combining element 201 is sensitive to the incident angle of light, polarized light separation and combination can be accomplished in a highly reliable fashion, and thus, a uniform illumination light can be obtained.

The shifting distances $\beta 1$, $\beta 2$, and $\beta 3$ of the first to third condensing mirror plates 301, 302, and 303 from the x, y, and z axes, and the shifting directions thereof are not limited to those employed in the present embodiment. However, it is required that the shifting distances $\beta 1$, $\beta 2$, and $\beta 3$ of the first to third condensing mirror plates and the shifting directions thereof be determined such that the secondary light source images associated with the z-polarized lights and the secondary light source images associated with the x-polarized lights are formed at locations spatially separated from each other, and such that the secondary light source images associated with the z-polarized lights originating from the light emitted from the first light source 101 and the secondary light source images associated with the z-polarized lights originating from the light emitted from the second light source 102 are superimposed upon each other, and still such that the secondary light source images associated with the x-polarized lights originating from the light emitted from the first light source 101 and the secondary light source images associated with the x-polarized lights originating from the light emitted from the second light source 102 are superimposed upon each other.

Therefore, it is not necessarily needed to shift all of the first to third condensing mirror plates in parallel to the corresponding axes (x axis, y axis, and z axis). For example, only the second condensing mirror plate 302 may be shifted in parallel while the first and third condensing mirror plates 301 and 303 are not shifted but they are disposed such that the x axis and the z axis pass through the center of the respective condensing mirror plates. Conversely, only the first and third condensing mirror plates 301 and 303 may be shifted in parallel while the second condensing mirror plate 302 is not shifted but it is disposed such that the y axis passes through its substantial center. However, in some cases, depending on the shifting distance and the shifting direction of the first to third condensing mirror plates, the condensing lens unit 401 has to be shifted relative to the y axis.

Although in the present embodiment, the $\lambda/2$ phase 421 is disposed on the side facing the illumination area of the condensing lens plate 411, the $\lambda/2$ phase plate 421 may be disposed at any location near the locations where the secondary light source images are formed, and there is no specific limitation. For example, the $\lambda/2$ phase plate 421 may be disposed on the surface facing the light source of the condensing lens plate 411.

Furthermore, if each small lens 412 of the condensing lens plate 411 is formed in a decentered fashion such that the lights emerging from the respective small lenses 412 are directed toward the illumination area 601, then the condensing mirror plate 411 also serves as a superimposing lens similar to the superimposing lens 431. Alternatively, the small condensing mirrors 311 of the first to third condensing mirror plates 301, 302, and 303 may be formed in a decentered fashion such that the lights reflected by the small condensing mirrors 311 are directed toward the illumination area 601. In this case, the first to third condensing mirror plates 301, 302, and 303 also provide the function realized by the superimposing lens 431 in the above example. Thus, in these two cases, the superimposing lens 431 can be removed. This allows a reduction in the cost of the polarized light illumination apparatus. In the latter case, the distance between the secondary light source images formed by the x-polarized lights and the secondary light source images formed by the z-polarized lights, shown in FIG. 7, becomes smaller than $\beta 1+\beta 2$.

In the case where the lights emitted from the first and second light sources 101 and 102 have a high degree of parallelism, the condensing lens plate 411 may be removed.

Furthermore, although the small lenses 412 of the condensing lens plate 411 are formed in the shape of a rectangle longer in the horizontal direction than in the vertical direction, there is no particular limitation in the shape. However, because the secondary light source images C1 formed by the x-polarized lights and the secondary light source images C2 formed by the z-polarized lights are aligned in the horizontal direction as shown in FIG. 7, it is desirable that the shape of the small lenses 412 of the condensing lens plate 411 be determined in accordance with the locations where the secondary light source images are formed.

Furthermore, two different types of phase layers having different characteristics may be disposed at a location where the secondary light sources of the x-polarized lights are formed and at a location where the secondary light sources of the z-polarized lights are formed so that the lights are aligned in terms of polarization into a single particular direction. Alternatively, the phase layer 422 may disposed at a location where the secondary light source images C2 associated with the z-polarized lights are formed such that the illumination light becomes x-polarized.

Second Embodiment

Figure 8:
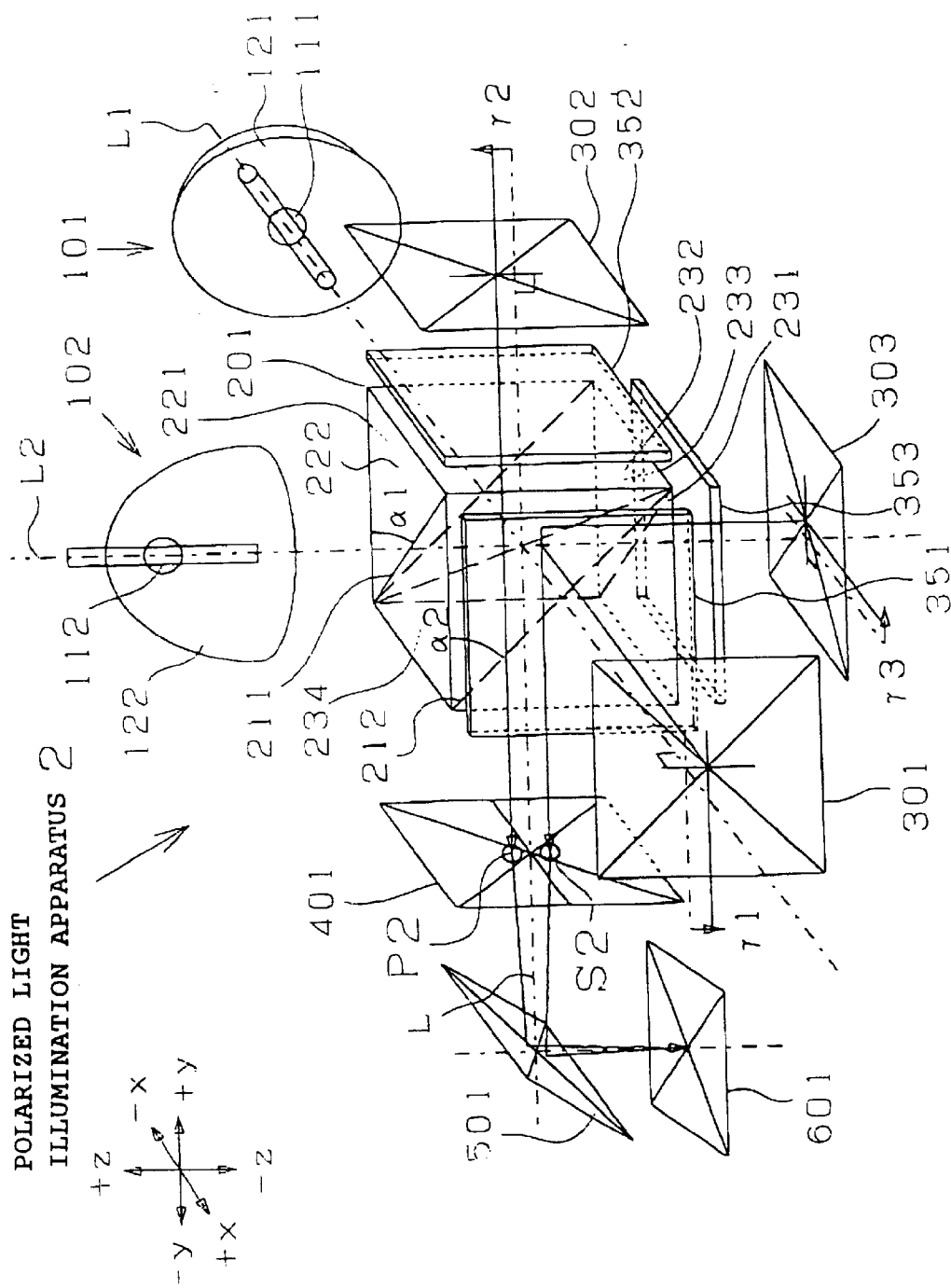
FIG. 8 is a schematic diagram of an optical system constructed to serve as a polarized light illumination apparatus according to a second embodiment of the invention.

In the polarized light illumination apparatus 1 shown in FIG. 1, the first to third condensing mirror plates 301, 302, and 303 are disposed so that the secondary light source images formed by the x-polarized light and the secondary light source images formed by the z-polarized light are aligned substantially in parallel along the x axis. Alternatively, as in a polarized light illumination apparatus 2 shown in FIG. 8, the first to third condensing mirror plates 301, 302, and 303 may be disposed such that the secondary light source images formed by the x-polarized light and the secondary light source images formed by the z-polarized light are aligned substantially in parallel along the z axis. In FIG. 8, P2 and S2 conceptually represent the locations where the secondary light source images associated with the x-polarized light and the z-polarized light are formed. More specifically, for example, the first condensing mirror plate 301 is shifted in parallel in the −z direction such that its center is apart from the x axis by γ1, the second condensing mirror plate 302 is shifted in parallel in the +z direction such that its center is apart from the y axis by γ2, and the third condensing mirror plate 303 is shifted in parallel in the +y direction such that its center is apart from the z axis by γ3. Also in this case, the basic principles of the polarized light illumination apparatus are similar to those of the polarized light illumination apparatus, and thus they are not described in further detail.

Third Embodiment

In the polarized light illumination apparatus 3 shown in FIG. 9 (illustrating a cross section taken along the xy plane), the respective optical systems are disposed in a substantially similar manner as in the first embodiment 1. However, a prism member 251 is formed of six transparent plates 252 serving as side walls, and a first polarized light separating plate 253 in a flat plate form on which a first polarization separating film 211 and a second polarized light separating plate (not shown, and strictly speaking, there are two second polarized light separating plates separated by the first polarized light separating plate 253) in a flat plate form on which a second polarization separating film (not shown) is formed are disposed in the inside of the prism member 251. Furthermore, the inside of the prism member 251 is filled with a liquid 254. The resultant prism member 251 is employed as the polarized light separating and combining element 201. Herein, it is required that the transparent plates, the first and second polarized light separating plates, and the liquid should be substantially equal in refractive index. This structure allows a reduction in cost and a reduction in weight of the polarized light separating and combining element 201.

In this polarized light illumination apparatus 3, as described earlier with reference to the first embodiment 1, the small lenses of the condensing lens plate 411 of the condensing lens unit 401 are constructed in a decentered fashion so that the condensing lens plate 411 also serves as a superimposing lens thereby making it unnecessary to dispose a separate superimposing lens. This structure allows a reduction in cost and a reduction in weight of the polarized light illumination apparatus.

Fourth Embodiment

In the polarized light illumination apparatus 4 shown in FIG. 10, although the respective optical systems are disposed in a similar manner as in the first embodiment 1, the polarized light separating and combining element 201 is constructed in the form of a flat plate. More specifically, two polarized light separating plates 261 (strictly speaking, there are three polarized light separating plates 261 because one polarized light separating plate is separated by the other polarized light separating plate) each consisting of a polarization separating film 262 disposed between two glass substrates 263 are disposed at an angle α45° to the optical axes (L1, L2) of the system, thereby achieving substantially the same functions as achieved by the polarized light separating and combining element 201 formed in a hexahedral shape (refer to FIG. 1). This structure allows a reduction in cost and a reduction in weight of the polarized light separating and combining element 201. In the present embodiment, unlike the first to third embodiments, the polarized light separating and combining element 201 does not actually have first to sixth surfaces, however, the polarized light separating optical element 201 has first to sixth virtual surfaces as represented by broken lines in FIG. 10. The first and second light sources 101 and 102, the λ/4 phase plates 351, 352, and 353, the condensing mirror plates 301, 302, and 303, the condensing lens unit 401, and other elements are disposed at locations with respect to the first and sixth virtual surfaces in a similar manner as in the first to third embodiments.

Fifth Embodiment

Figure 11:
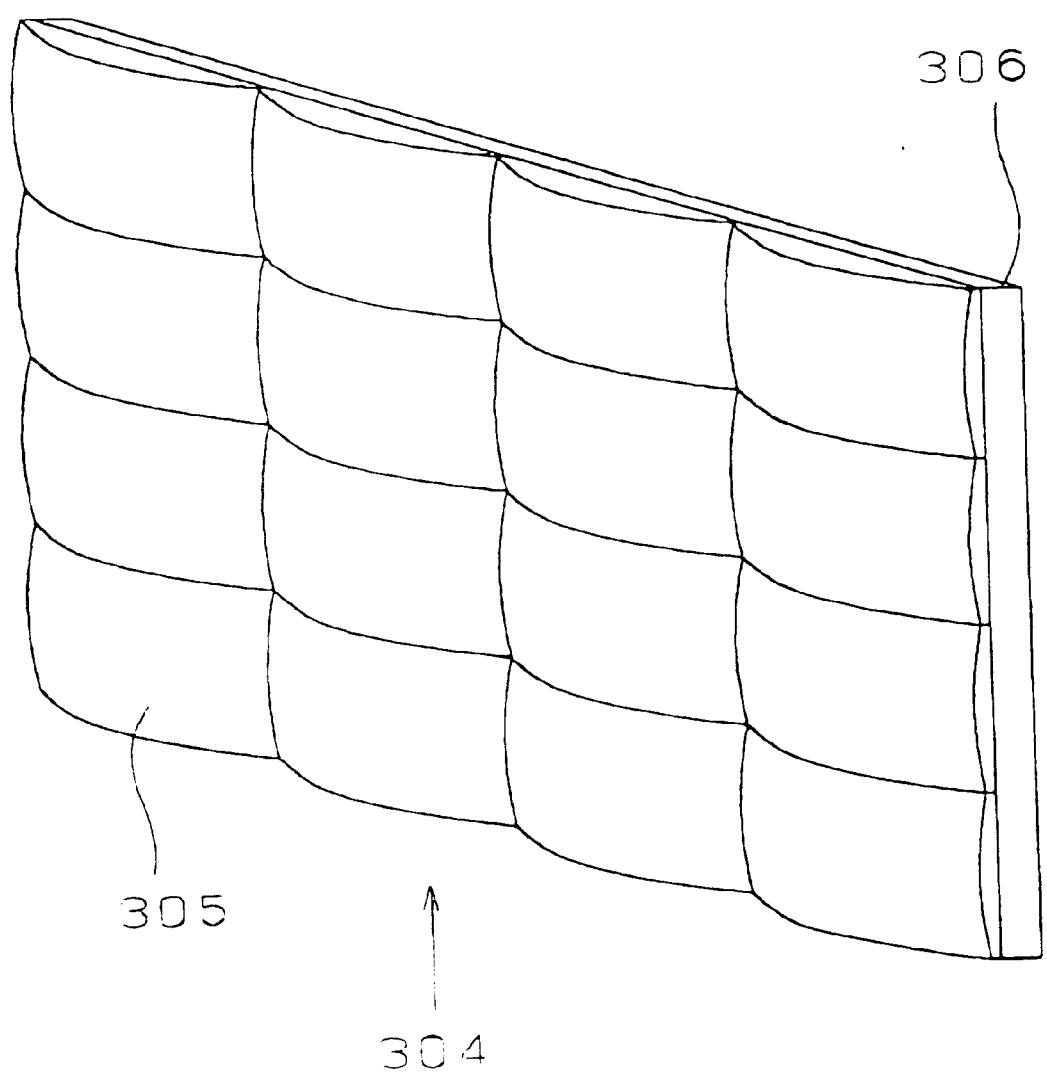
FIG. 11 is a perspective view of a condensing mirror plate according to a fifth embodiment, which can be employed in a polarized light illumination apparatus according to any of first to fourth embodiments.

In the polarized light illumination apparatuses 1 to 4 described above, one of or all of the first to third condensing mirror plates 301, 302, and 303 may be formed in the shape of a condensing mirror plate 304 shown in FIG. 11. Herein the condensing mirror plate 304 includes a plurality of small lenses 305 and a reflecting plate 306.

Furthermore, if each small lens 305 is formed in a decentered fashion such that the lights emerging from the respective small lenses 305 are directed toward the illumination area 601, then the first to third condensing mirror plates also serve as a superimposing lens similar to the superimposing lens 431. In this case, the superimposing lens 431 becomes unnecessary, and thus the polarized light illumination apparatus can be produced at lower cost.

Sixth Embodiment

Figure 12:
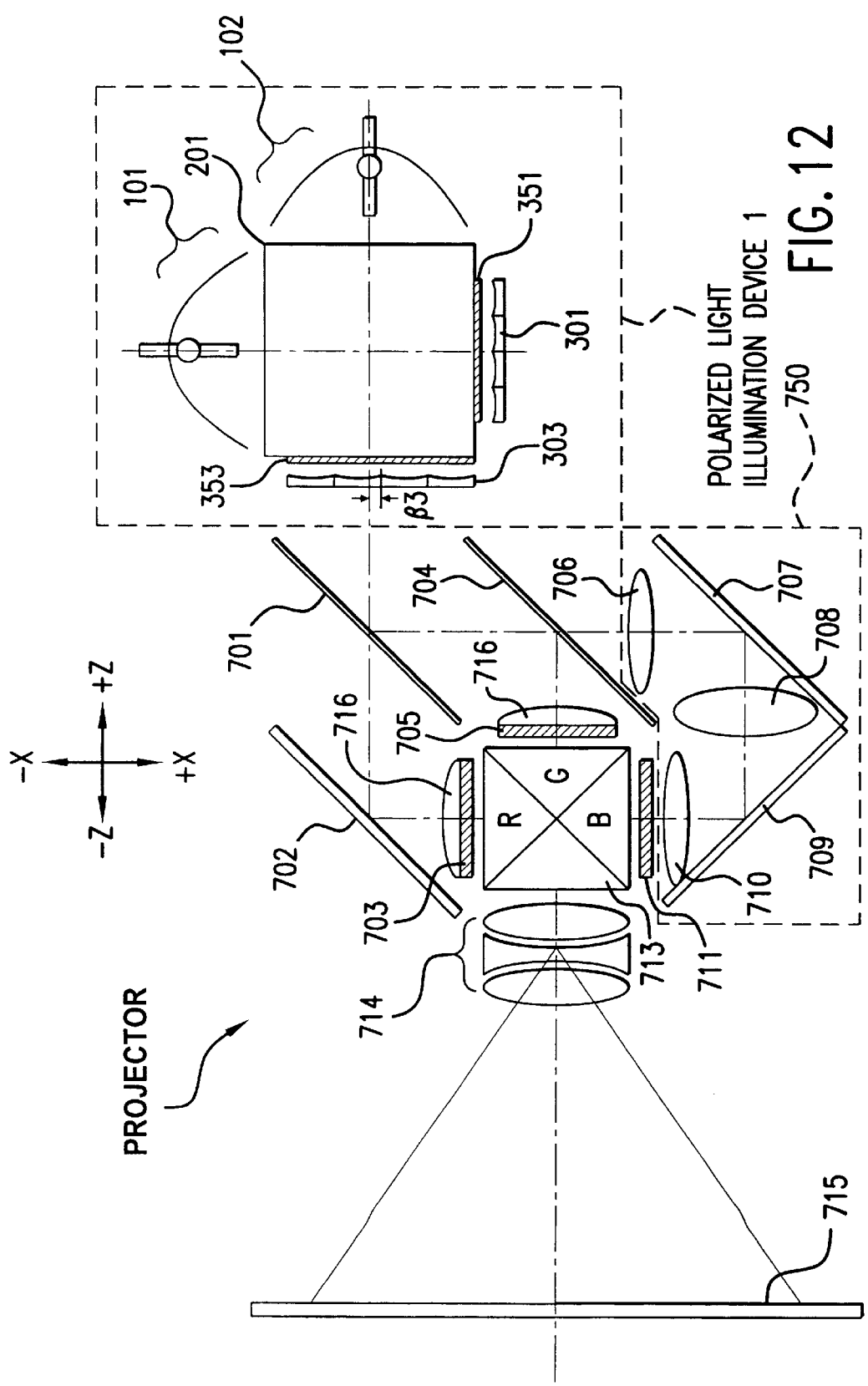
FIG. 12 is a cross-sectional view, taken in an xz-plane, of an optical system of a projector including the polarized light illumination optical system shown in FIG. 1 or 3.
Figure 13:
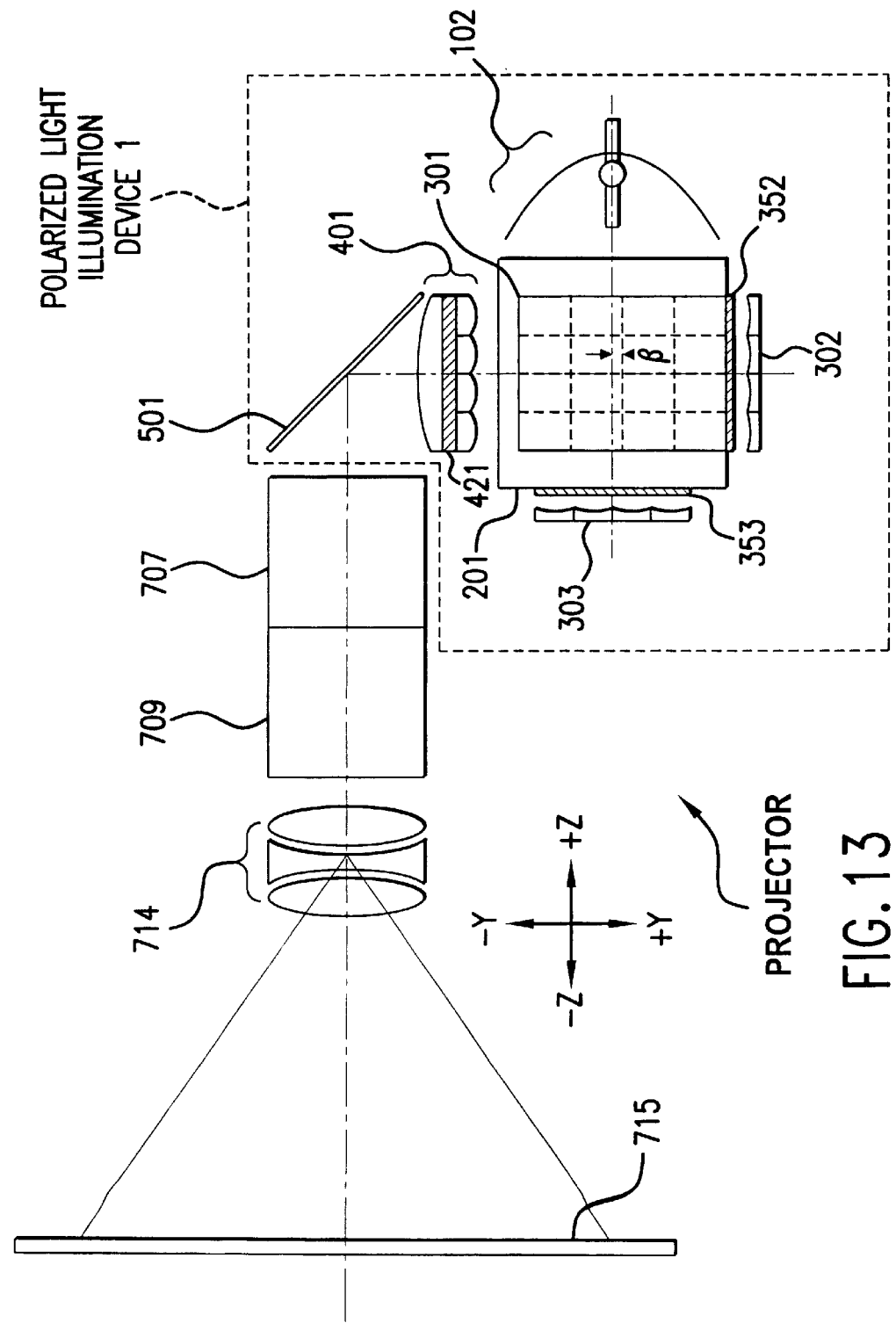
FIG. 13 is a cross-sectional view, taken in a yz-plane, of the optical system of the projector shown in FIG. 12.

Of polarized light illumination apparatuses disclosed in the first to fifth embodiments, the polarized light illumination apparatus 1 according to the first embodiment is employed herein in this sixth embodiment, by way of example, to construct a projector having improved capability of forming a projected image with higher brightness, as shown in FIGS. 12 and 13. In this projector 5 of the present embodiment, a transmissive liquid crystal light valve is employed as an optical modulator, and two different types of light source lamps with different emission spectra are used in the two light sources of the polarized light illumination apparatus 1 wherein these light source lamps can be selectively turned on. FIG. 12 is a cross-sectional view of the projector 5 taken along the xz plane, and FIG. 13 is a cross-sectional view of the projector 5 taken along the yz plane. Although the apparatus includes a condensing lens unit 401 and a reflecting mirror 501 serving as an optical path changing optical element, they are not shown in FIG. 12.

Referring to FIGS. 12 and 13, the polarized light illumination apparatus 1 disposed in the projector 5 of the present embodiment includes a first light source 101 and a second light source 102 for emitting randomly polarized lights in a single direction. The randomly polarized lights emitted from these light sources are separated by a polarized light separating and combining element 201 into two types of polarized lights, and then aligned in terms of polarization into the same single direction. The resultant light emerges from the condensing lens unit. In this specific embodiment, the polarization is aligned into the z direction. The polarized light emerging from the condensing lens is reflected by a reflecting mirror 501 and directed in the −z direction. Thus, the polarized light is incident on a blue/green color reflecting dichroic mirror 701.

When the illumination light emitted from the polarized light illumination apparatus 1 is incident on the blue/green light reflecting dichroic mirror 701 (colored-light separating optical element), a red light component passes through the dichroic mirror 701, however, blue and green light components are reflected. The red light is then reflected by a reflecting mirror 702 and directed to a first liquid crystal light valve 703 via a collimator lens 716. Although not shown in FIG. 12, polarizers are disposed on the incident and emitting sides of the liquid crystal light valve. Of the blue and green light components, the green light component is reflected by a green light reflecting dichroic mirror 704 (colored-light separating optical element) and directed to a second liquid crystal light valve 705 via a collimator lens 716. The collimator lenses 716 disposed on the incident sides of the first and second liquid crystal light valves 703 and 705 prevent the light striking the liquid crystal valves from diverging thereby achieving an improved illumination efficiency. The collimator lenses 716 also serve to effectively direct the light emerging from the liquid crystal light valves to a projection lens. On the incident side of a third liquid crystal light valve 711, there is provided an emitting-side lens 710 forming a light guiding means 750, as will be described in detail later. The emitting-side lens 710 also provides a function similar to that of the collimator lenses 716. However, these collimator lenses 716 may be removed.

The blue light has a long optical path compared with the other two colored lights, and the light guiding system 750 realized with a relay lens system including an incident-side lens 706, a relay lens 708, and an emitting-side lens 710 is disposed in the optical path. That is, the blue light passes through the green light reflecting dichroic mirror 704 and is directed to the relay lens 708 via the incident lens 706 and the reflecting mirror 707. The blue light is focused by the relay lens 708 and then reflected by the reflecting mirror 709 toward the emitting-side lens 710. Thus, the blue light reaches the third liquid crystal light valve 711.

The first to third liquid crystal light valves 703, 705, and 711 modulate the respective colored lights so as to give image information associated with the respective colors to the corresponding colored lights. The modulated colored lights are incident on the cross-dichroic prism 713 (colored light combining optical element). The cross-dichroic prism 713 includes a red light reflecting dielectric multilayer film and a blue light reflecting dielectric multilayer film which are both disposed inside the cross-dichroic prism 713 and which intersect each other in the shape of a cross. The cross-dichroic prism 713 combines the modulated colored lights into a single light. The resultant combined light is projected onto a screen 715 via a projection lens 714 (projection optical system) thereby forming an image on the screen 715.

The liquid crystal light valves employed in this projector 5 each serves to modulate one type of polarized light. Therefore, if a conventional illumination apparatus is used to illuminate the liquid crystal light valves with randomly polarized light, then one-half or a greater part (typically 60%) of the randomly polarized light will be absorbed by the polarizers and converted to heat. Thus, the efficiency in use of light is low and a large-size cooling system, which often generates large noise, is required to remove the heat from the polarizers. Such problems are solved in the projector 5 of the present embodiment.

More specifically, in the projector 5 of the present embodiment, the light emitted from the polarized light illumination apparatus 1 is aligned in terms of polarization in the same single direction by rotating the polarization direction of only a component polarized in a particular direction (for example in the x direction) via a γ/2 phase plate 421 thereby converting the state of polarization of that component into the same state of polarization as that of the remaining component (polarized for example in the z direction) whereby the first to third liquid crystal light valves 703, 705, and 711 are all illuminated with the light polarized in the same single direction. As a result, the efficiency in use of light is improved and a bright image can be projected. Furthermore, because the absorption of light by the polarizers decreases, the temperature increase of the polarizers is suppressed. This allows a small-sized cooling system which generates low noise to be employed. Furthermore, using two light sources including the first and second light sources 101 and 102, light whose polarization is aligned into the same single direction is emitted without causing a loss for any light emitted from the first and second light sources 101 and 102, thereby ensuring that a bright image can be projected. Still furthermore, in the polarized light illumination apparatus 1, because the polarization separating films are formed using a dielectric multilayer film which is thermally stable, the polarized light separating and combining element 201 has thermally stable polarized light separation performance. As a result, when the polarized light illumination apparatus 1 is used in the projector 5 which requires a high optical output, stable polarized light separation performance can be achieved.

Furthermore, even though two light sources 101 and 102 are used, the illumination lights emitted from the two light sources 101 and 102 can be combined into a single light without causing an increase in the incident angle (illumination angle) of the illumination light to the illumination area. This means that the illumination light has the same cross section as obtained using only one light source. Thus, the amount of light per unit area can be increased to a level approximately two times greater than that obtained with a single light source. This makes it possible to project an image with greater brightness.

Furthermore, in the polarized light illumination apparatus 1, the two types of polarized lights emerging from the polarized light separating and combining element 201 are separated in the horizontal direction to fit the illumination areas or the displaying areas longer in the horizontal direction than in the vertical direction of the liquid crystal light valves so that the illumination areas having rectangular shapes longer in the horizontal direction than in the vertical direction are illuminated in a highly efficient fashion without wasting light. Thus, the polarized light illumination apparatus 1 is suitable to be coupled with a liquid crystal light valve with a shape longer in the horizontal direction than in the vertical direction to project a beautiful image with outstanding quality.

Furthermore, in the present embodiment, the cross-dichroic prism 713 employed as the colored-light combining optical element allows a size reduction and also reductions in the optical paths between the projection lens 714 and the respective liquid crystal light valves 703, 705, and 711. This makes it possible to obtain a bright projected image using a projection lens with a rather small diameter. Of the three optical paths associated with the respective colored lights, one optical path is different in length from the other two optical paths. In the present embodiment, in the optical path for the blue light having the greatest length, there is provided the light guiding means 750 realized with the relay lens system including the incident-side lens 706, the relay lens 708, and the emitting-side lens 710 so as to prevent problems such as a color variation.

Furthermore, in the present embodiment, the reflecting mirror 501 serving as the optical path changing optical element is disposed between the condensing lens unit 401 serving as the polarization conversion optical element and the blue/green light reflecting dichroic mirror 701, whereby the traveling direction of the polarized light emerging from the polarization conversion optical element is changed. This allows the plane in which the colored-light separating optical element, the colored-light combining optical element, the optical modulator, and the optical projection system are located and the plane in which the polarized light illumination apparatus 1 including two light sources having rather large sizes is located to be parallel to each other. Thus, it becomes possible to realize a thin projector having a small size in one direction.

In the polarized light illumination apparatus 1 disposed in the projector 5 according to the present embodiment, one of the first and second light sources 101 and 102 may be formed to be detachable. This allows a user to easily carry the projector 5 after removing one of the light sources.

In the polarized light illumination apparatus 1 in the projector 5 of the present embodiment, two types of light source lamps different in emission spectrum or brightness characteristics are used in the respective light sources 101 and 102, and these light source lamps can be selectively turned on. This brings about the following features and advantages.

1) By combining two types of light source lamps having a different emission spectrum, it becomes possible to realize an ideal illumination apparatus or an illumination apparatus ideal for use in a projector. More specifically, it is ideal to use light source lamps in projectors to provide a large optical output over the entire wavelength range including the wavelengths of blue, green, and red. It is also ideal that the optical output be well balanced between blue, green, and red. However, at present, such an ideal light source lamp is hardly available. FIGS. 14(A)–(C) illustrate the spectra of light emitted from light source lamps and a polarized light illumination apparatus. For example, a lamp (such as a high-pressure mercury lamp) having a relatively high luminous efficiency but having a relatively low intensity at a wavelength corresponding to red as shown in FIG. 14(A) is widely used. Another widely used lamp (such as a certain type of metal halide lamp) has, as shown in FIG. 14(B), a relatively high luminous intensity for red but has a relatively low luminous efficiency. If two types of light source lamps having emission spectra shown in FIGS. 14(A) and 14(B), respectively, are employed in the polarized light illumination apparatus 1 of the projector 5 and if both lamps are turned on during the operation, then the resultant light emitted from the polarized light illumination apparatus 1 has an ideal spectrum as shown in FIG. 14(C). This makes it possible to easily realize a projector capable of projecting a high-quality image with a high brightness.

2) By selectively turning on the two types of light source lamps having different emission spectra, the color tone of the projected image can be changed in accordance with preferences of a user.

3) By selectively turning on the two types of light source lamps, it is possible to change the brightness of the projected image depending on the environment in which the projector is used or depending on preferences of the user. More specifically, when the projector is used in a light environment, both light sources may be turned on, whereas only one of the light sources may be turned on when it is used in a dark environment.

4) If the two light source lamps are alternately used, the life of each light source lamp becomes longer. Furthermore, when one of the light source lamps becomes unusable because of a failure or expiration of life, it is possible to continue to form a projected image using the remaining light source lamp. Thus, operability is improved. Furthermore, when the projector is driven by a battery, only one of the light sources may be selectively used thereby making it possible to increase the battery life.

Although the polarized light illumination apparatus 1 is employed, by way of example, in the present embodiment, any of the polarized light illumination apparatuses 2 to 4 may also be employed.

Seventh Embodiment

The polarized light illumination apparatus according to the present invention may also be used in a projector using a reflective liquid crystal light valve as an optical modulator.

Figure 15:
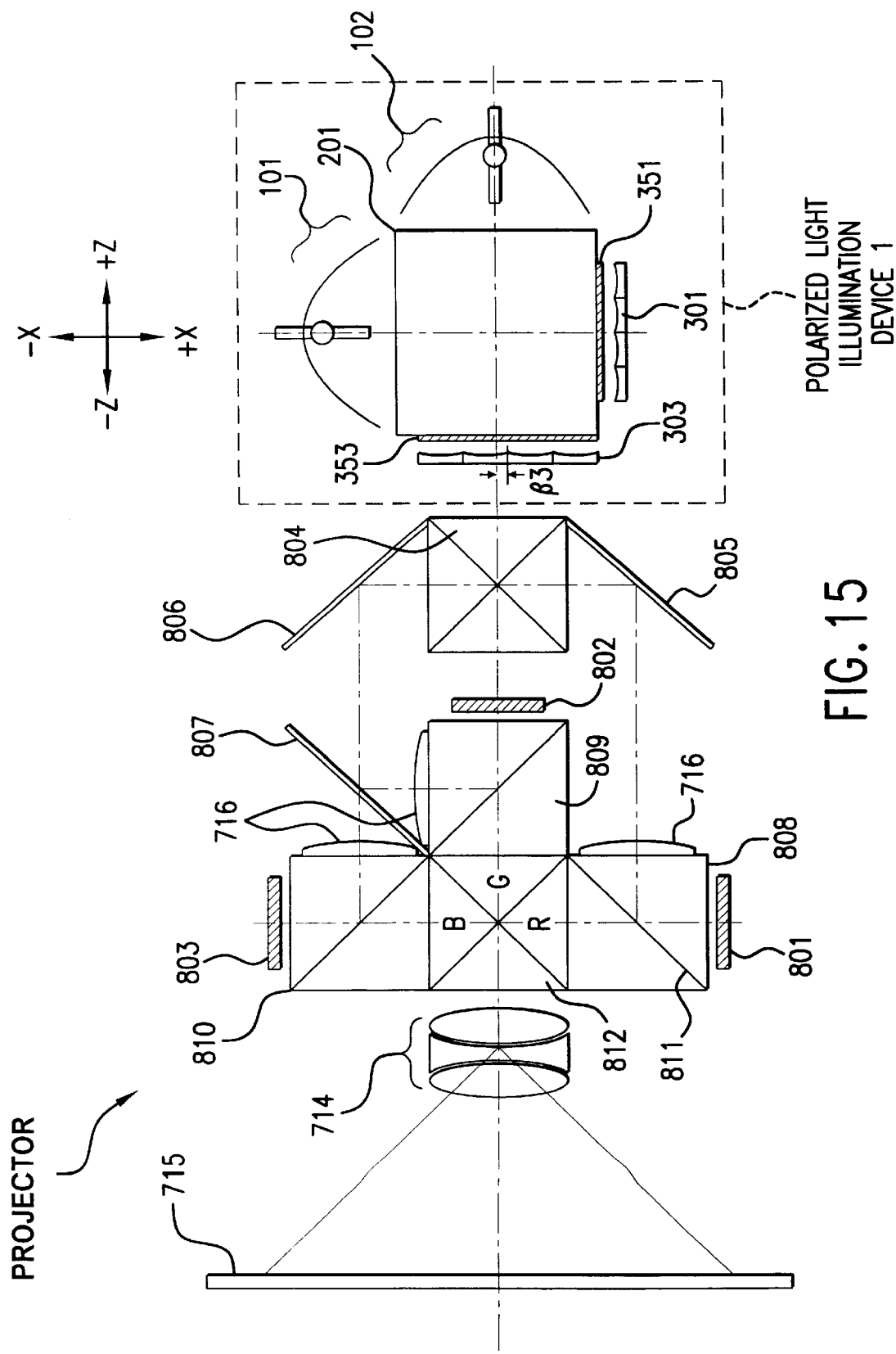
FIG. 15 is a cross-sectional view, taken in an xz-plane, of another example of an optical system used in a projector including the polarized light illumination optical system shown in FIG. 1 or 3.

FIG. 15 illustrates a projector 6 (in cross section taken along the xz plane) in which the polarized light illumination apparatus 1 according to the first embodiment is employed. Randomly polarized lights emitted from the first and second light source 101 and 102 are first separated by the polarized light separating and combining element 201 into two types of polarized lights, and then aligned in terms of polarization into the same single direction. The resultant light emerges from the condensing lens unit. In this specific embodiment, polarization is aligned in the z direction, and the resultant light is used to illuminate the reflective liquid crystal light valves 801, 802, and 803 disposed at three different locations.

The light emitted from the polarized light illumination apparatus 1 (also in this embodiment, as in the projector 5 described above, there are provided a condensing lens unit and a reflecting mirror serving as an optical path changing optical element, although they are not shown in the figure) is first separated into red light and blue/green lights via a colored-light separation cross-dichroic prism 804 (colored-light separation optical element) including a blue/green light reflecting dielectric multilayer film and a red light reflecting dielectric multilayer film which are disposed in the form of a cross. The red light is incident on a first polarized beam splitter 808 via a reflecting mirror 805 and a collimator lens 716. On the other hand, the blue/green lights are reflected by a reflecting mirror 806 and then separated into green light (reflected light) and blue light (transmitted light) by a green light reflecting dichroic mirror 807 (colored-light separation optical element). The respective colored lights are incident on second and third polarized beam splitters 809 and 810, respectively, via a collimator lens 716. The polarized beam splitters 808, 809, and 810 (polarized light separating optical elements) disposed at three different locations each includes a polarized light separation plane 811 which transmits a P-polarized component and reflects an S-polarized component of incident light, thereby separating the incident light into P- and S-polarized lights. Almost all of the lights emerging from the condensing lens unit 401 (FIG. 1) of the polarized light illumination apparatus 1 is z-polarized. The z-polarized light is converted to y-polarized light when it is reflected by the reflecting mirror 501, wherein the y-polarized light behaves as an S-polarized light when it is incident on the polarized light separating plane 811 of the first to third polarized beam splitters 808, 809, and 810. Thus, almost all of the colored lights incident on the first to third polarized light beam splitters 808, 809, and 810 is reflected by the polarized light separating plane 811 and the traveling direction thereof is changed by substantially 90°. The resultant lights are then incident on an adjacent one of first to third reflective liquid crystal light valves 801, 802, and 803, respectively. However, there is a possibility that the colored lights incident on the first to third polarized beam splitters 808, 809, and 810 include a small amount of light polarized in a direction (for example P-polarized direction) other than the S-polarized direction. Such a light polarized in a different direction passes through the polarized light separating plane 811 and emerges from the polarized beam splitters without being changed in the traveling direction. Thus, such a light does not contribute to illuminating the reflective liquid crystal light valves. The collimator lenses 716 disposed on the incident sides of the respective polarized beam splitters work in a similar maimer as the collimator lenses 716 employed in the projector 5 according to the sixth embodiment. Therefore, these collimator lenses 716 may be disposed between the polarized beam splitters and the corresponding reflective liquid crystal light valves. However, the collimator lenses 716 may be removed, if desired.

The lights (S-polarized lights) incident on the reflective liquid crystal light valves are modulated by the respective liquid crystal light valves in accordance with image information supplied from the outside. More specifically, when the lights pass through the reflective liquid crystal light valves, the polarization directions of the respective lights are changed in accordance with image information and the traveling directions thereof are substantially reversed. The lights emerging from the reflective liquid crystal light valves are again incident on the polarized beam splitter. At this time, because the lights emerging from the respective liquid crystal light valves are partially P-polarized depending on the image information, only P-polarized components pass through the polarized beam splitters depending on the polarization selectivity of the polarized beam splitters (thus an image corresponding to the image information is formed). The transmitted lights are directed to the colored-light combining cross-dichroic prism 812. The colored lights incident on the colored-light combining cross-dichroic prism 812 (colored-light combining optical element) are combined into a single optical image and projected onto a screen 715 via a projection lens 714 (optical projection system) thereby forming a color image thereon.

Also in this projector 6 using reflective liquid crystal light valves, the reflective liquid crystal light valves modulate only one type of polarized light.

Therefore, if the reflective liquid crystal light valves are illuminated with randomly polarized light emitted from a conventional illumination apparatus, then one-half or a greater part (typically 60%) of the randomly polarized light will be absorbed by the polarizers and converted to heat. Thus, the efficiency in use of light is low and a large-size cooling system, which often generates large noise, is required to remove the heat from the polarizers. Such problems are solved in the projector 6 of the present embodiment.

More specifically, in the projector 6 of the present embodiment, the light emitted from the polarized light illumination apparatus 1 is aligned in terms of polarization in the same single direction by rotating the polarization axis of only a component polarized in a particular direction (for example in the x direction) via a λ/2 phase plate (not shown), thereby converting the state of polarization of that component into the same state of polarization as that of the remaining component (polarized for example in the z direction), whereby the first to third liquid crystal light valves 801, 802, and 803 are all illuminated with the light polarized in the same single direction. As a result, the efficiency in use of light is improved and a bright image can be projected. Furthermore, because the absorption of light by the polarizers decreases, the temperature increase of the polarizers is suppressed. This allows a small-sized cooling system which generates low noise to be employed. Furthermore, using two light sources including the first and second light sources 101 and 102, light whose polarization is aligned into the same single direction is emitted without causing a loss for any light emitted from the first and second light sources 101 and 102, thereby ensuring that a bright image can be projected. Still furthermore, in the polarized light illumination apparatus 1, because the polarization separating film is formed using a dielectric multilayer film which is thermally stable, it is thermally stable in the polarized light separation performance. As a result, when the polarize light illumination apparatus 1 is used in the projector 6 which requires a high optical output, stable polarized light separation performance can be achieved.

Furthermore, even though two light sources 101 and 102 are used, the illumination lights emitted from the two light sources 101 and 102 can be combined into a single light without causing an increase in the incident angle (illumination angle) of the illumination light to the illumination area. This means that the illumination light has the same cross section as obtained when only one light source is used. Thus, the amount of light per unit area can be increased to a level approximately two times greater than that obtained with a single light source. This makes it possible to project an image with greater brightness.

Also in the projector 6 of the present embodiment, a reflecting mirror (not shown) serving as an optical path changing optical element is disposed between a condensing lens unit (not shown) serving as a polarization conversion optical element and a color separation cross-dichroic prism 804. This makes it possible, as in the sixth embodiment, to realize a projector having a size reduced in one direction.

Also in the projector 6 of the present embodiment, one of the first and second light sources 101 and 102 may be formed to be detachable. Furthermore, two types of light source lamps having different emission spectra or different brightness characteristics may be employed in the first and second light sources 101 and 102. The two light source lamps may be selectively turned on, thereby achieving similar advantages as described above.

Polarizers may be disposed on the incident sides of the respective polarized beam splitters 808, 809, and 810, and on the emitting sides of the respective polarized beam splitters 808, 809, and 810, or on the emitting side of the colored-light combining cross-dichroic prism, thereby increasing the contrast of the displayed image.

In the art of projectors using a reflective light valve as is the case with the present embodiment, it is known to realize a color separating and combining optical system using a combination of one polarized beam splitter and one color separating and combining prism. In this case, the polarized light emitted from the polarized light illumination apparatus is directed to the color separating and combining prism via the polarized beam splitter and the color separating and combining prism separates the received polarized light into different colored lights, which are supplied to the reflective light valves. The reflective light valves modulate the respective lights. The resultant lights are again incident on the color separating and combining prism to combine the lights into a single light which is then projected via the polarized beam splitter.

Although the polarized light illumination apparatus 1 is employed, by way of example, in the present embodiment, any of the polarized light illumination apparatuses 2 to 4 may also be employed.

Other Embodiments

In the case of a projector using transmissive light valves, a colored-light combining optical element formed of two dichroic mirrors, that is, a so-called mirror optical system, may also be employed instead of the cross-dichroic prism 713 employed in the projector 5 according to the sixth embodiment. In this case, the polarized light illumination apparatus according to the present invention is also applicable. In the case where the mirror optical system is employed, it is possible to construct the projector such that the optical paths between the polarized light illumination apparatus and the respective liquid crystal light valves disposed at three different locations are equal to one another. This makes it possible to provide illumination with small variations in brightness and color tone without having to use the light guiding means 750 such as that employed in the first embodiment.

In each embodiment described above, the condensing lens unit 401 converts the x-polarized light to a z-polarized light thereby obtaining an illumination light whose polarization is aligned into the z direction. Instead, z-polarized light may be converted to an x-polarized light thereby obtaining an illumination light whose polarization is aligned into the x direction. In this case, the phase layer 422 of the λ/2 phase 421 is disposed at locations where the secondary light source images of the z-polarized lights are formed. The alignment of polarization may also be accomplished by rotating the polarization for - both z- and x-polarized lights. In this case, the phase layer is disposed at locations where the secondary light source images of both z- and x-polarized lights are formed.

In the embodiments described above, the λ/2 phase plate and the λ/4 phase plate are assumed to be formed of a widely used polymer film. Alternatively, these phase plates may be formed of a twisted nematic (TN) liquid crystal. In the case where a TN liquid crystal is employed to form the phase plates, it is possible to reduce dependence upon wavelength. As a result, the λ/2 phase plate and the λ/4 phase plates have higher polarization conversion performance than can be obtained using a widely used polymer film.

In the embodiments described above, the second polarization separating film is formed of a dielectric multilayer film. However, the FTIR film may also be formed of a particular liquid crystal material. Therefore, the second polarization separating film may also be formed of such a liquid crystal material.

The polarized light illumination apparatus disclosed above with reference to specific embodiments are particularly useful when it is used in a projector including a light valve such as a liquid crystal light valve which works on light polarized in a particular direction. However, when it is applied to a projector including a light valve such as DMD (trademark of Texas Instruments Inc., USA) whose operation is not based on particular polarization of light, the polarized light illumination apparatus according to the present invention can also provide similar features and advantages as described above.

What is claimed is:

1. A polarized light illumination apparatus, comprising:
   a first light source and a second light source;
   a polarized light separating and combining optical element including: a) a first polarization separating film which transmits linearly polarized light emitted from said first light source and polarized in a direction parallel to an incidence plane, but which reflects linearly polarized light emitted from said first light source and polarized in a direction perpendicular to the incidence plane; and b) a second polarization separating film which transmits a linearly polarized light emitted from said second light source and polarized in the direction perpendicular to the incidence plane, but which reflects linearly polarized light emitted from said second light source polarized in the direction parallel to the incidence plane;
   a first condensing and reflecting optical element including a plurality of small condensing and reflecting elements that substantially reverses a traveling direction of said linearly polarized light transmitted through said first polarization separating film and a condensed light image;
   a second condensing and reflecting optical element including a plurality of small condensing and reflecting elements substantially a traveling direction of said linearly polarized light reflected by the first polarization separating film and the second polarization separating film and a condensed light image;
   a third condensing and reflecting optical element including a plurality of small condensing and reflecting elements substantially a traveling direction of said linearly polarized light transmitted through said second polarization separating film and a condensed light image;
   a first polarization-state conversion optical element disposed between said polarized light separating and combining optical element and said first condensing and reflecting optical element;

a second polarization-state conversion optical element disposed between said polarized light separating and combining optical element and said second condensing and reflecting optical element;

a third polarization-state conversion optical element disposed between said polarized light separating and combining optical element and said third condensing and reflecting optical element; and a polarization conversion optical element a direction of polarization of the linearly polarized lights combined by said polarized light separating optical element a center axis of light which is incident on said polarization conversion optical element after being reflected by the small condensing and reflecting elements of said first condensing and reflecting optical element and said third condensing and reflecting optical element and a center axis of light which is incident on said polarization conversion optical element after being reflected by said small condensing and reflecting elements of said second condensing and reflecting optical element parallel to each other and not each other.

2. The polarized light illumination apparatus according to claim 1, an opening of each small condensing and reflecting element being geometrically similar in shape to an area to be illuminated.

3. The polarized light illumination apparatus according to claim 1, further comprising a condensing optical element including a plurality of condensing elements that condenses light emerging from said polarized light separating and combining optical element disposed on one of an incident side and an emitting side of said polarization conversion optical element.

4. The polarized light illumination apparatus according to claim 1, further comprising a superimposing optical element that superimposes the lights emerging from said polarization conversion optical element upon one another in an illumination area.

5. The polarized light illumination apparatus according to claim 1, further comprising an optical path changing element that changes an optical path of light emerging from said polarization conversion optical element disposed on an emitting side of said polarization conversion optical element.

6. The polarized light illumination apparatus according to claim 1, said small condensing and reflecting elements of said first condensing and reflecting optical element, said second condensing and reflecting optical element, and said third condensing and reflecting optical element each comprising a curved surface reflecting mirror.

7. The polarized light illumination apparatus according to claim 1, said small condensing and reflecting elements of said first condensing and reflecting optical element, said second condensing and reflecting optical element, and said third condensing and reflecting optical element each comprising a lens and a reflecting surface formed on a surface of said lens opposite to said polarized light separating and combining optical element.

8. A projector comprising:
the polarized light illumination apparatus according to claim 1;
an optical modulator that modulates light emitted from said polarized light illumination apparatus; and
a projecting optical system that projects the light modulated by said optical modulator.

9. A projector comprising:
the polarized light illumination apparatus according to claim 1;
a colored-light separating optical element that separates light emitted from said polarized light illumination apparatus into a plurality of colored lights;
a plurality of optical modulators that respectively modulate the colored lights separated by the colored-light separating optical element;
a colored-light combining optical element that combines the lights modulated by the plurality of optical modulators; and
a projecting optical system that projects the light combined by said colored-light combining optical element.

10. A projector comprising:
the polarized light illumination apparatus according to claim 1;
a reflective optical modulator that modulates light emitted from said polarized light illumination apparatus;
a polarized light separating optical element that separates a plurality of polarized light components contained in the light emitted from the polarized light illumination apparatus and in the light modulated by the reflective optical modulator from one another; and
a projecting optical system that projects the light modulated by said reflective optical modulator and then emitted via said polarized light separating optical element.

11. A projector comprising:
the polarized light illumination apparatus according to claim 1;
a plurality of reflective optical modulators that modulate light emitted from said polarized light illumination apparatus;
a polarized light separating optical element that separates a plurality of polarized light components contained in the light emitted from the polarized light illumination apparatus and in the light modulated by the plurality of reflective optical modulators from one another;
a colored-light separating and combining optical element disposed between said polarized light separating optical element and said plurality of reflective optical modulators that separates the light emitted from said polarized light illumination apparatus into a plurality of colored lights and combines the colored lights emitted from said plurality of reflective optical modulators; and
a projecting optical system that projects the light modulated by the plurality of reflective optical modulators and then emitted via the colored light separating and combining optical element and the polarized light separating optical element.

12. A projector comprising:
the polarized light illumination apparatus according to claim 1;
a colored-light separating optical element that separates light emitted from said polarized light illumination apparatus into a plurality of colored lights;
a plurality of reflective optical modulators that respectively modulate the colored lights separated by the colored-light separating optical element;
a plurality of polarized light separating optical elements that separate a plurality of polarized light components contained in the colored lights separated by said colored-light separating optical element and in the colored lights modulated by said plurality of reflective optical modulators from one another;

a colored-light combining optical element that combines the lights modulated by the plurality of reflective optical modulators and then emitted via the plurality of polarized light separating optical element; and a projecting optical system that projects the light combined by said colored-light combining optical element.

13. The projector according to claim 9, at least one of the first light source and the second light source being detachable.

14. The projector according to claim 9, at least one of the first light source and the second light source being selectively turned on.

15. The projector according to claim 8, at least one of the first light source and the second light source being detachable.

16. The projector according to claim 8, at least one of the first light source and the second light source being selectively turned on.

17. The projector according to claim 10, at least one of the first light source and the second light source being detachable.

18. The projector according to claim 10, at least one of the first light source and the second light source being selectively turned on.

19. The projector according to claim 11, at least one of the first light source and the second light source being detachable.

20. The projector according to claim 11, at least one of the first light source and the second light source being selectively turned on.

21. The projector according to claim 12, at least one of the first light source and the second light source being detachable.

22. The projector according to claim 12, at least one of the first light source and the second light source being selectively turned on.

* * * * *